(12) United States Patent
Schouenborg

(10) Patent No.: US 12,484,824 B2
(45) Date of Patent: Dec. 2, 2025

(54) COMPRISING A MICROELECTRODE OR A SET OF MICROELECTRODES

(71) Applicant: NEURONANO AB, Karlshamn (SE)

(72) Inventor: Jens Schouenborg, Lund (SE)

(73) Assignee: NEURONANO AB (SE)

( * ) Notice: Subject to any disclaimer, the term of this patent is extended or adjusted under 35 U.S.C. 154(b) by 1017 days.

(21) Appl. No.: 17/418,885

(22) PCT Filed: Jan. 3, 2020

(86) PCT No.: PCT/SE2020/000001
§ 371 (c)(1),
(2) Date: Jun. 28, 2021

(87) PCT Pub. No.: WO2020/141997
PCT Pub. Date: Jul. 9, 2020

(65) Prior Publication Data
US 2022/0110567 A1     Apr. 14, 2022

(30) Foreign Application Priority Data

Jan. 4, 2019   (SE) .................................. 1800248-5

(51) Int. Cl.
*A61B 5/263*     (2021.01)
*A61B 5/00*      (2006.01)

(52) U.S. Cl.
CPC ............ *A61B 5/263* (2021.01); *A61B 5/6867* (2013.01); *A61B 2562/028* (2013.01)

(58) Field of Classification Search
CPC . A61B 5/263; A61B 5/388; A61B 2562/0209; A61B 2562/04;
(Continued)

(56) References Cited

U.S. PATENT DOCUMENTS

| 7,949,412 B1 | 5/2011 | Harrison et al. ............... 607/137 |
| 2007/0135881 A1 | 6/2007 | Vilims .......................... 607/117 |

(Continued)

FOREIGN PATENT DOCUMENTS

| EP | 2 612 691 A1 | 7/2013 |
| WO | WO 2010/144016 A1 | 12/2010 |

(Continued)

OTHER PUBLICATIONS

International Search Report mailed Mar. 16, 2020 in corresponding PCT International Application No. PCT/SE2020/000001.
(Continued)

*Primary Examiner* — Adam Z Minchella
*Assistant Examiner* — Ashleigh Lauren Kern
(74) *Attorney, Agent, or Firm* — OSTROLENK FABER LLP

(57) ABSTRACT

A microelectrode probe for implantation into soft tissue comprises an envelope of flexible polymer material divided by a wall into a distal and a proximal compartment filled with matrices of biocompatible material dissolvable or degradable in aqueous body fluid and comprising a centrally disposed electrically conducting core penetrating the wall and attached to it. The core is insulated at its proximal portion from which it extends to a holder for attachment to a tissue different from said soft tissue. The envelope and the core extending distally from the holder are embedded in an additional matrix of similar kind. Also disclosed is method for its manufacture, an array comprising two or more microelectrode probes and a microelectrode probe for incorporation into the array as well as method for the manufacture of the array.

18 Claims, 17 Drawing Sheets

Figure 4A:
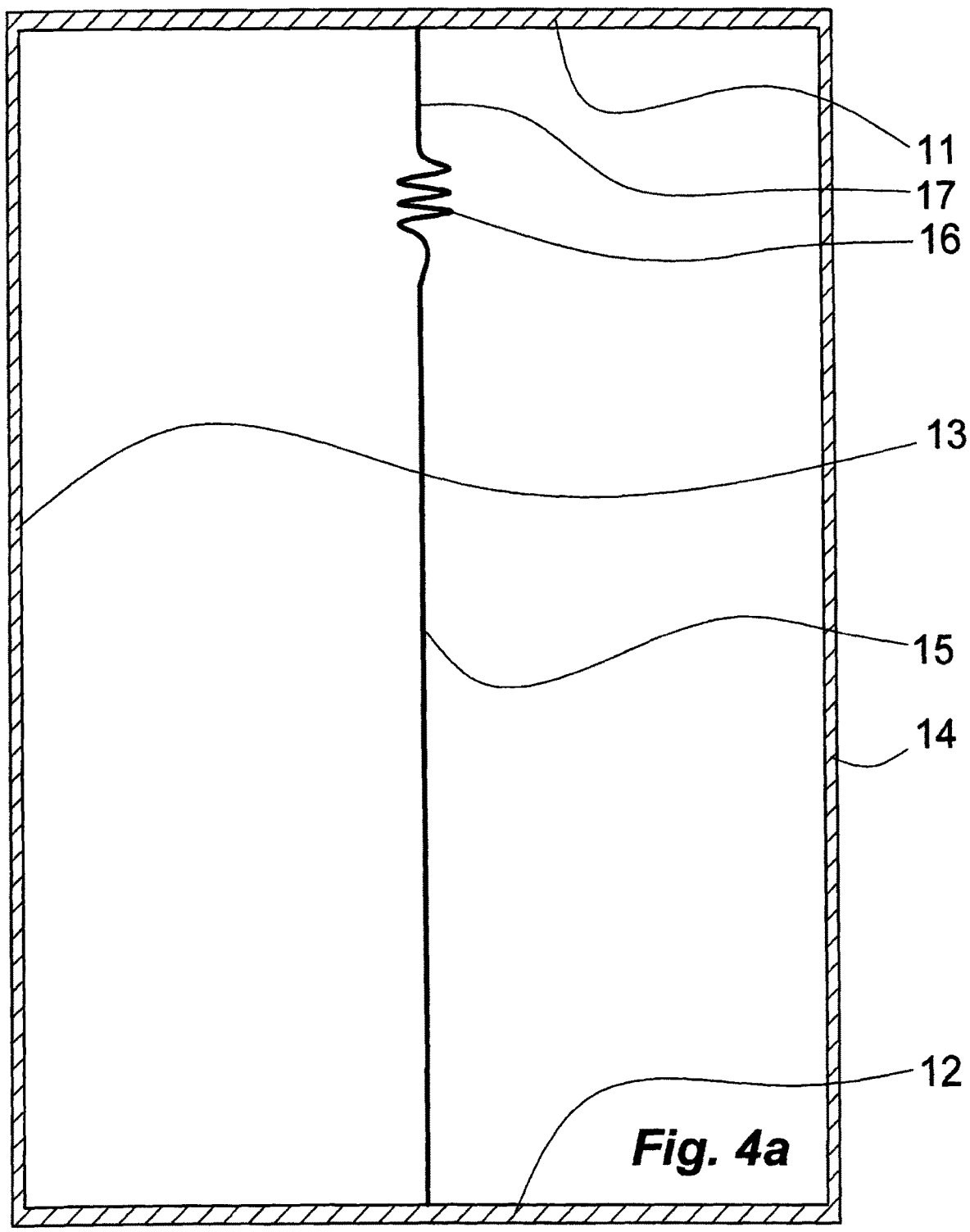
Figure 4B:
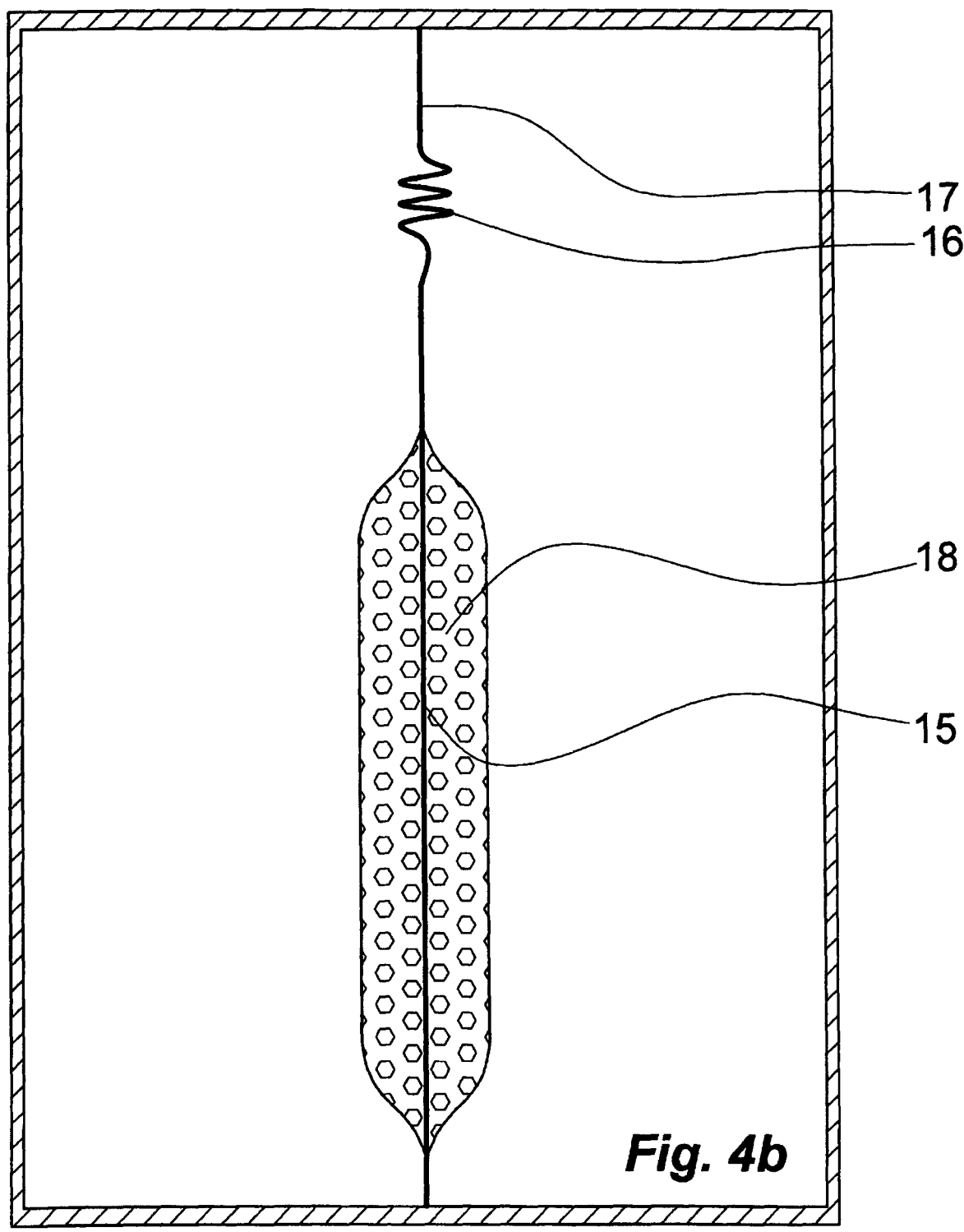

(58) Field of Classification Search
CPC ........ A61B 2562/125; A61B 2562/164; A61B 2562/046; A61B 5/0031; A61B 5/1486; A61B 5/37; A61B 2562/0285; A61B 5/6867; A61B 2562/028; A61B 5/24; C01B 32/05; C08L 79/08; C08L 83/04; C08L 2203/02; C08L 65/04; D01F 9/22; D04H 1/4242; D04H 1/728; H01B 1/04; H01B 7/048; H01B 3/30; C01P 2006/40; D10B 2509/00; C08G 2261/3424; A61N 1/05; A61N 1/0539; A61N 1/0529; A61N 1/0536; A61N 1/0558

See application file for complete search history.

(56) References Cited

U.S. PATENT DOCUMENTS

| | | | |
|---|---|---|---|
| 2010/0121422 A1 | 5/2010 | Jolly et al. | 607/137 |
| 2011/0087315 A1 | 4/2011 | Richardson-Burns et al. | 607/116 |
| 2012/0078330 A1 | 3/2012 | Doerr | 607/116 |
| 2012/0123318 A1* | 5/2012 | Ek | A61N 1/0476 604/20 |
| 2015/0151107 A1* | 6/2015 | Schouenborg | A61B 18/14 604/20 |
| 2016/0302682 A1* | 10/2016 | Lieber | A61B 5/283 |
| 2017/0251976 A1* | 9/2017 | Schouenborg | A61B 5/4064 |

FOREIGN PATENT DOCUMENTS

| | | |
|---|---|---|
| WO | WO 2013/191612 A1 | 12/2013 |
| WO | WO 2015/094076 A1 | 6/2015 |

OTHER PUBLICATIONS

Written Opinion mailed Mar. 16, 2020 in corresponding PCT International Application No. PCT/SE2020/000001.

* cited by examiner

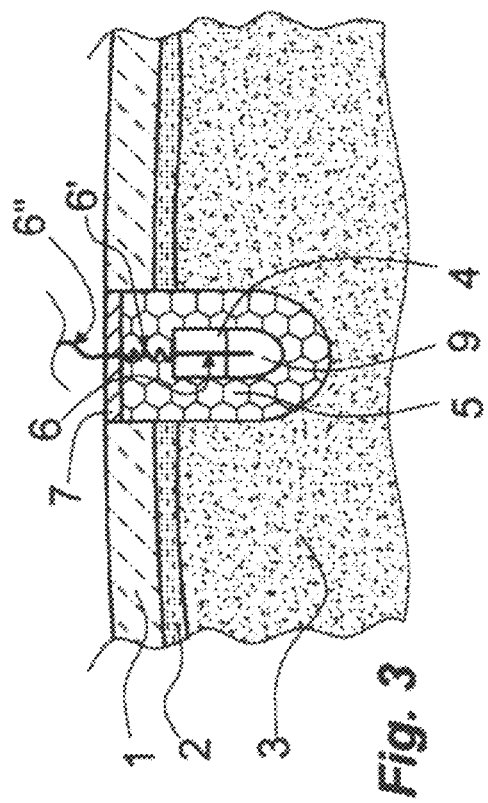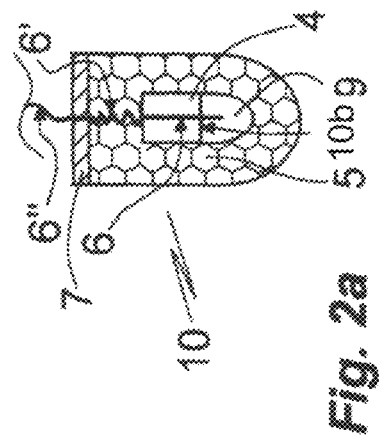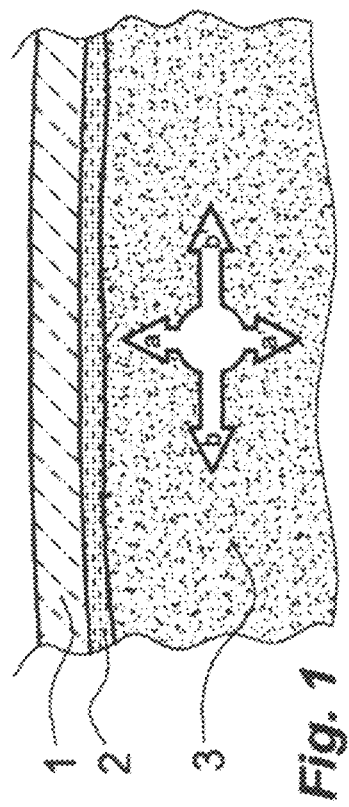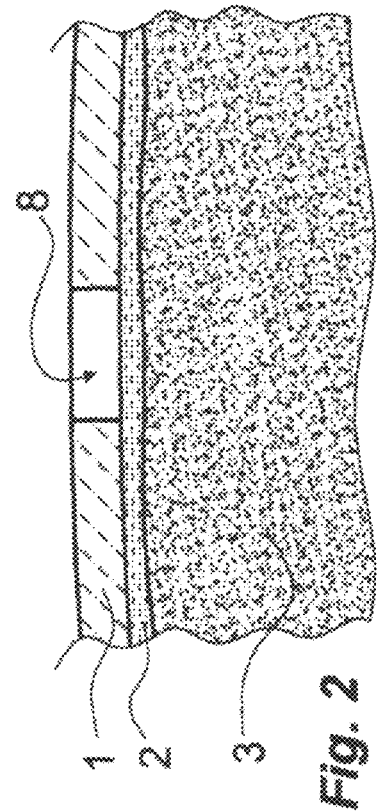
Fig. 1
Fig. 2
Fig. 2a
Fig. 3

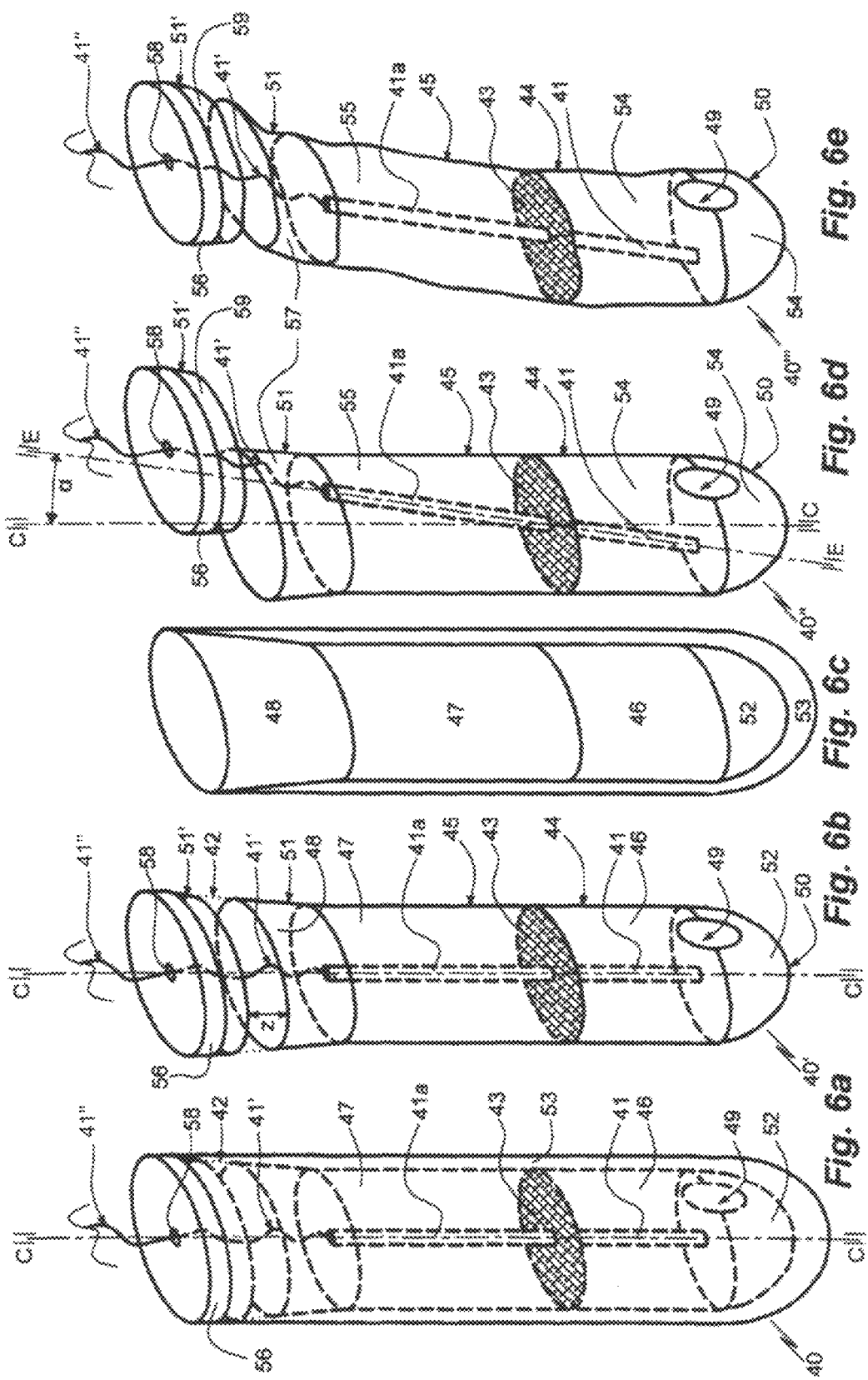

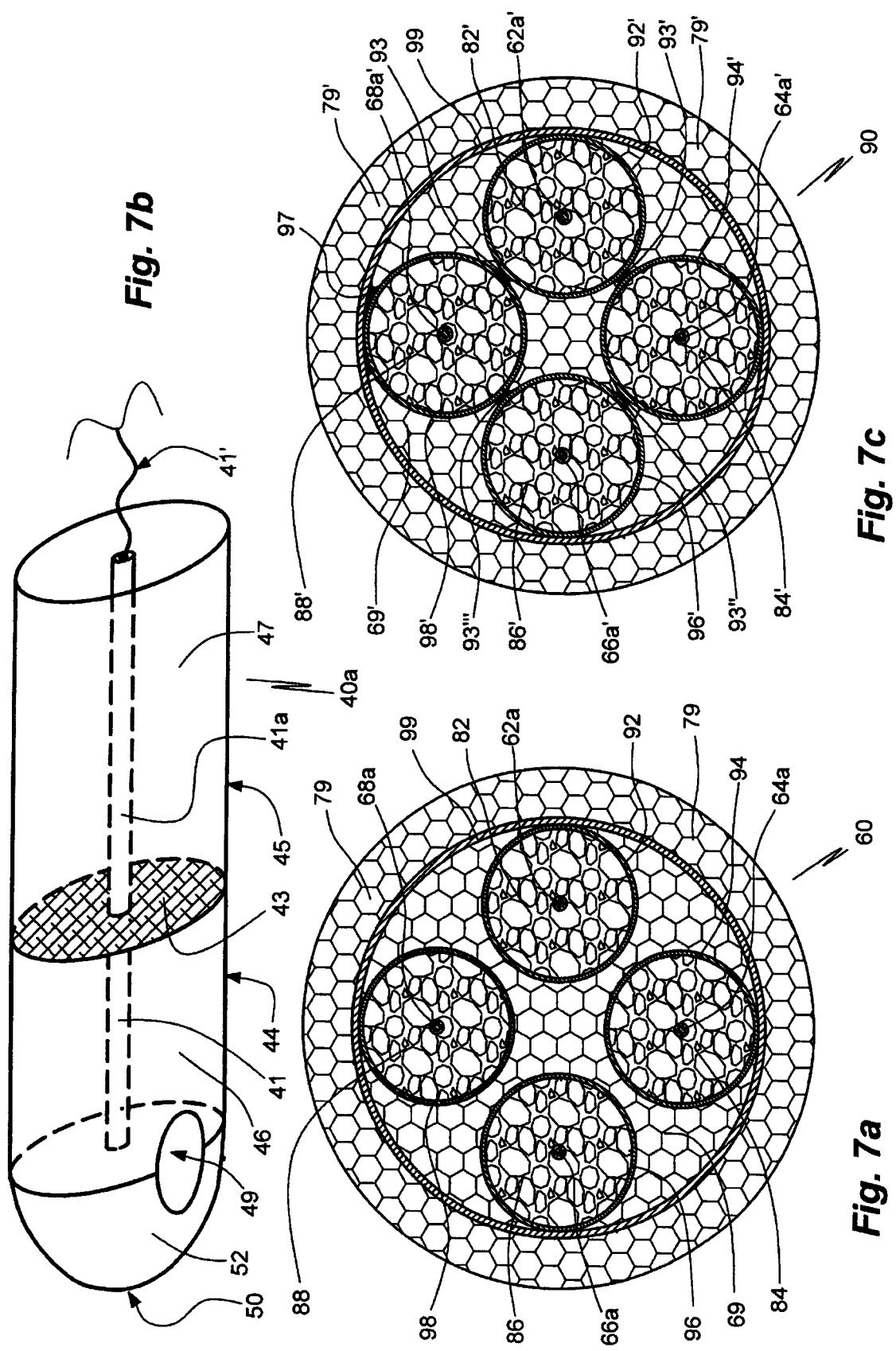

COMPRISING A MICROELECTRODE OR A SET OF MICROELECTRODES

CROSS-REFERENCE TO RELATED APPLICATIONS

The present application is a 35 U.S.C. §§ 371 national phase conversion of PCT/SE2020/000001, filed Jan. 3, 2020, which claims priority to Swedish Patent Application No. 1800248-5, filed Jan. 4, 2019, the contents of which are incorporated herein by reference. The PCT International Application was published in the English language.

FIELD OF THE INVENTION

The present invention relates to probes comprising single microelectrodes or sets of microelectrodes for implantation by insertion into soft tissue, in particular nervous tissue or endocrine tissue. The present invention furthermore relates to the use and manufacture of such probes.

BACKGROUND

Implantable microelectrodes and sets of microelectrodes have a wide scope of applications in medicine and veterinary medicine.

A microelectrode implanted into nervous tissue, independent from whether constituting a single implant or pertaining to an implant comprising multiple microelectrodes such as a bundle or array of microelectrodes, requires electrical connection to control device(s) disposed exteriorly of the tissue. This connection is generally provided by thin insulated flexible electrical leads. The leads bridge tissues of various kind and stiffness and thereby become affected by their recurrent displacement relative to each other caused by breathing, heart beets, head and spine movements, etc. This kind of tissue movement may similarly affect other thin and flexible implants such as microfibers, in particular optical microfibres.

An example for a situation in which movements of tissues relative to each other can be observed is when an electrical lead bridges the skull and the brain via a space comprising dura mater, arachnoid membrane, cerebrospinal fluid, and pia mater. Other examples are leads bridging vertebrae and spinal cord; muscle and adjacent fibrous sheets; peripheral nerve and surrounding soft tissue. These movements of tissues relative to each other result in shear forces at their bordering area, which risk causing persistent local inflammation and tissue injury. In addition, shear forces of this kind may affect the position of the active, non-insulated portion of an implanted microelectrode.

OBJECTS OF THE INVENTION

An object of the invention is to provide a microelectrode implanted in soft tissue, in particular nervous or endocrine tissue, and electrically connected with control apparatus disposed exteriorly of the tissue, which avoids or at least reduces tissue irritation by movements of tissue abutting it or abutting a lead electrically connecting it with electrode control apparatus disposed outside the tissue of implantation.

Another object of the invention is to prevent or reduce dislocations of an implanted microelectrode by forces affecting the lead by which it is electrically connected with electrode control apparatus.

Still another object of the invention is to provide for increased freedom of lateral movement of an implanted microelectrode.

In the context of the present invention it is also desired to avoid transfer of aqueous body fluid between fluid reservoirs disposed at or surrounding the proximal and distal ends or proximal and distal portions of an implanted microelectrode.

A further object of the invention is to provide a microelectrode probe or an array of such probes for implantation into soft tissue, in particular nervous or endocrine tissue, capable of there being transformed to a microelectrode or an array of microelectrodes by contact with aqueous body fluid.

An additional object of the invention is to provide methods of manufacture for a microelectrode probe and an array of microelectrode probes of the invention.

SUMMARY OF THE INVENTION

The present invention discloses proto-microelectrode microelectrode probes for implantation into soft tissue, in particular nervous or endocrine tissue, and a microelectrode formed from the proto microelectrode probe upon implantation.

The terms 'distal' and 'proximal' are used for characterization of certain parts of the microelectrode and specifically the electrically conductive core of the microelectrode. A proximal section (or portion) of the electrically conductive core of the microelectrode is a section which is closer to optional control devices (or closer tissue separating a living organism from the environment [e.g. skin tissue] than a distal section (or portion). Distal and proximal sections (or portions) are separated by an intermediate part of the electrically conductive core of the microelectrode. The termination of the intermediate section (or portion) and beginning of distal and proximal sections (or portions) [in respect of the intermediate section (or portion)] should not be understood as a highly specific positions but rather as a continuum. Further, the distal portion of the electrode core is positioned in proximal and distal compartments. Proximal and distal compartments are separated by a radially extending wall.

The term 'flexible' is used for the characterization of several features of the invention, notably an electrically conducting body or core and an envelope or sleeve comprising or consisting of at least one layer, typically two or three layers, of a flexible material. The flexibility of the core and the flexibility of the envelope or sleeve (of flexible polymer material) provides for increased freedom of specifically lateral movement of an implanted microelectrode. Hence, the flexibility of core and envelope or sleeve facilitate the reduction of irritation (e.g. inflammation) of soft tissue (e.g. neural, endocrine and other soft tissue) in contact with the microelectrode after implantation and the dissolution and/or degradation of biocompatible matrices.

The microelectrode formed from the probe upon implantation comprises an oblong, electrically conducting microelectrode body or core covered, except for a distal portion thereof, which may be a terminal distal portion, by a layer of electrically insulating material, in particular of electrically insulating polymer material. At its proximal end the microelectrode core is attached to an electrical connector in form of a thin, flexible, electrically insulated lead for connecting, directly or indirectly, the microelectrode core with control apparatus disposed exteriorly of the tissue of implantation. Alternatively, the microelectrode core and the lead are integral, that is, consist of one piece.

The electrically insulating material may constitute any material providing electric insulating capability which is also suited for the method of manufacturing the microelectrode probe. Typically, the insulating material should exhibit characteristics enabling the material to be deposed by dip coating, spray coating, vapor deposition or casting, or any combination thereof. Exemplified insulating materials include biocompatible electrically insulating materials such as various polymers including polyurethanes, polyethylenes and polymers referred to as Parylenes, typically Parylene C and Parylenen M.

The microelectrode formed from the probe upon implantation into soft tissue furthermore comprises a holder comprising a proximal face and a distal face. The electrical connector can be firmly attached to the holder and provides for electrical connection with microelectrode control apparatus. The holder is, in turn, directly or indirectly attached to a tissue the movements of which do not or only minimally mechanically affect the soft tissue into which the microelectrode probe (microelectrode) or microelectrode array probe (microelectrode array) has been implanted.

The present invention is based on the insight that direct contact of an implanted microelectrode core with adjacent soft tissue, in particular nervous tissue but also endocrine tissue, exocrine tissue, muscular tissue and connective tissue, can be avoided or at least reduced by means of an oblong protective rotationally symmetric envelope or sleeve of flexible polymer material surrounding or enclosing the microelectrode core laterally and distally while being kept at a distance from the core to allow the core to move within the envelop or sleeve while avoiding contact with surrounding tissue. The avoidance of contact protects the microelectrode core from being affected by a displacement of adjacent nervous or endocrine tissue. It is preferred for the distance between a core disposed centrally in the envelope or sleeve, that is, superimposed to its rotational axis, and an inner wall of the envelope or sleeve, to be greater by a factor of 2, in particular by a factor of 5 or even 10 or 50 or more, than the diameter of the core independent of whether covered by a layer of polymer electrical insulation material or not.

The present invention is based on the additional insight that, by separating the interior of the envelope or sleeve into distal and proximal compartments by arranging a separating wall of flexible polymer material extending in a radial direction which includes perpendicular or any angular direction in respect of the axis of rotational symmetry while making the core penetrate the separating wall, preferably at or near its center, and fasten it there to the separating wall, the movement of the core inside of the envelope or sleeve thus being predominantly restricted to lateral movements of its distal tip while movements in an axial direction are opposed and thus restricted. This arrangement provides the further advantage of preventing a flow of aqueous body fluid between the distal and proximal ends of the envelope or sleeve. A restriction or prevention of such flow is desired in the event that the distal and proximal ends of the envelope or sleeve are disposed in different tissues comprising aqueous body fluid differing in composition, and that an exchange of aqueous body fluid between the tissues is to be avoided. This is, for instance, of importance when avoiding communication of cerebrospinal fluid with nervous tissue in the neighborhood of the distal core portion lacking insulation. The core may penetrate the separating wall at any location, e.g. the core may penetrate the separating wall non-centrically such as closer to the envelope or sleeve than to the center of the separating wall.

This arrangement additionally provides for a medicament or other chemical agent disposed inside of the envelope or sleeve of a microelectrode probe being delivered to tissue disposed adjacent to a lateral or distal wall of the distal compartment of the envelope or sleeve through at least one opening thereof which may be disposed at or near its distal end upon implantation and transformation of the probe to a microelectrode while avoiding delivery through the proximal opening. The opening or openings may also be located at any position of the distal compartment, such as in the middle or close to the proximal part of the distal compartment, i.e. in close vicinity to the wall partitioning proximal and distal compartments.

The present invention is furthermore based on the idea of avoiding or at least reducing tissue inflammation by shear forces caused by an electrical core or lead passing through such types of tissue, in particular through tissues moving in respect of each other and in respect of the electrical connector. This effect is obtained by providing an electrical core or lead of substantially greater length than the length required just to bridge the distance between the proximal end of the microelectrode core and the envelope or casing of the distal compartment and by using a lead of high flexibility.

Figure 5:
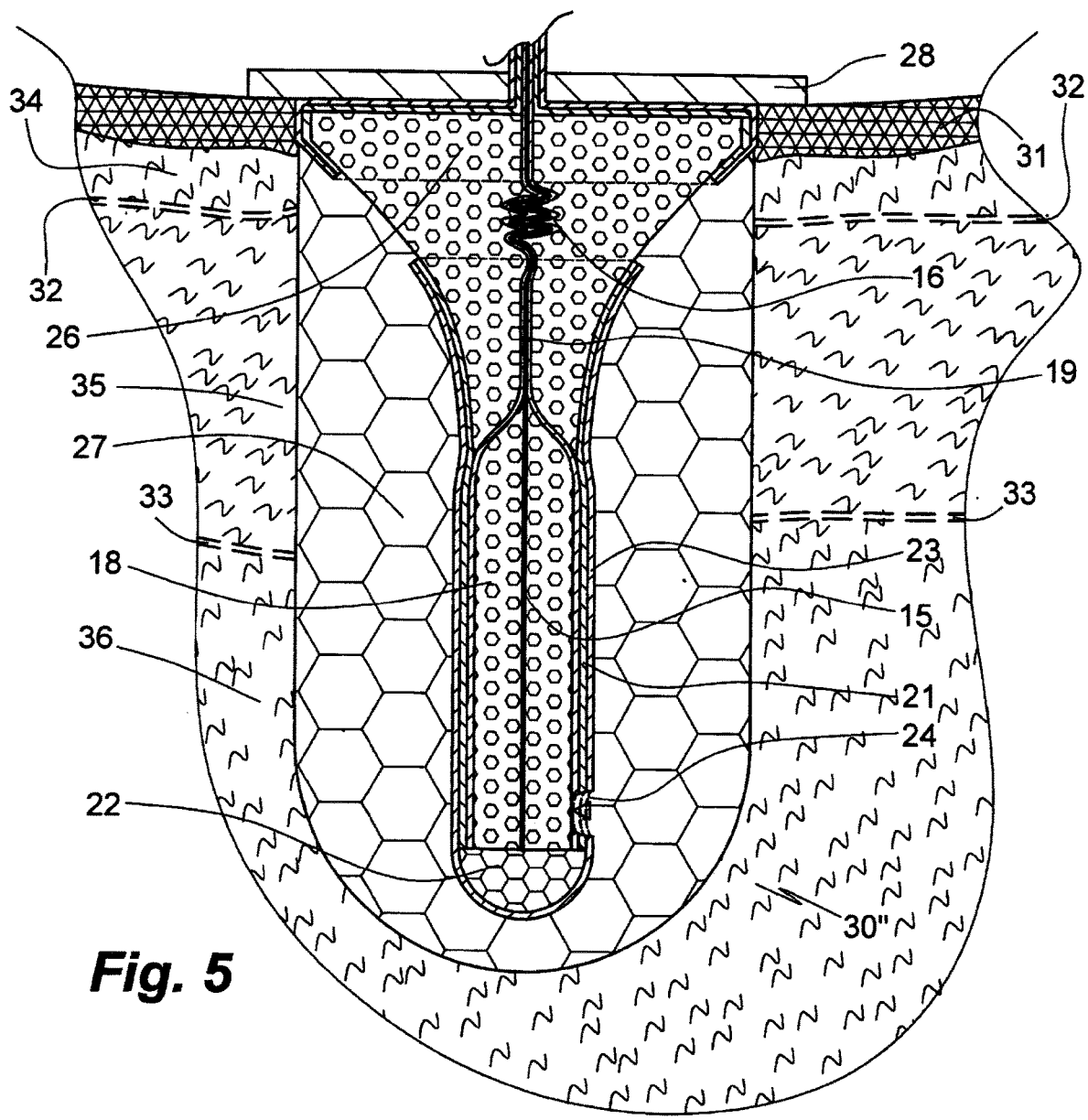
Figure 5C:
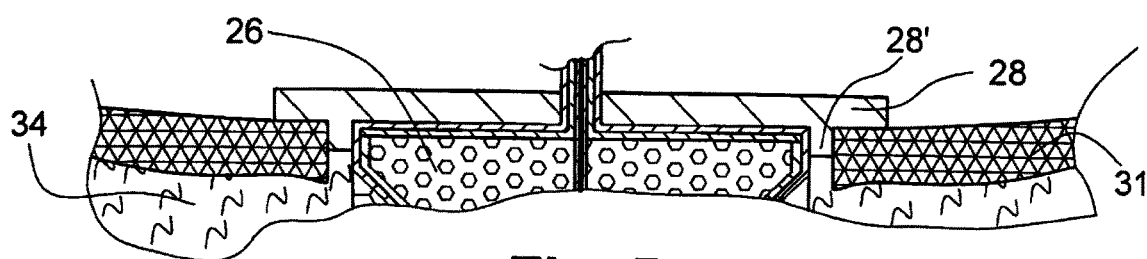
Figure 5A:
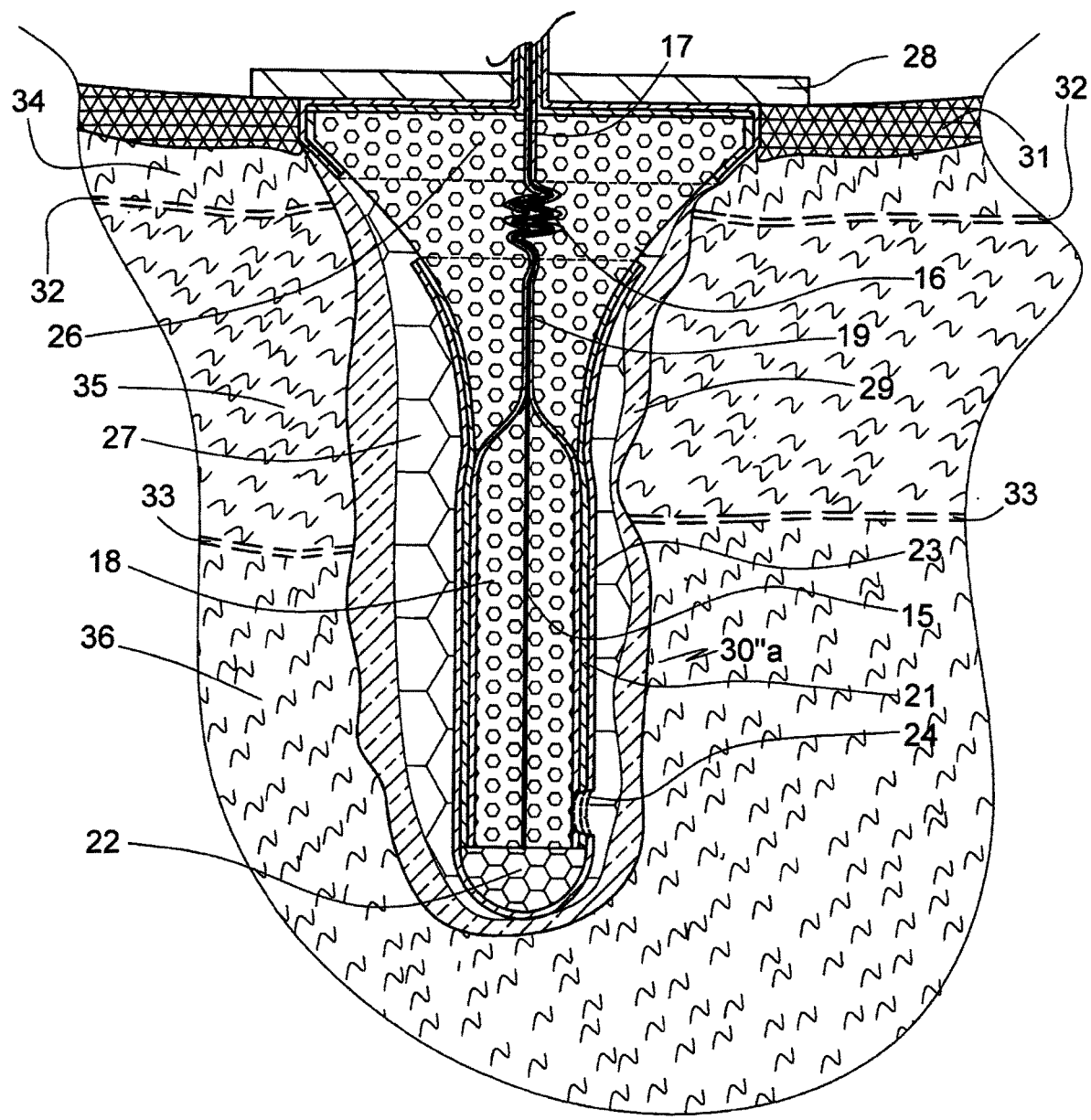
Figure 5B:
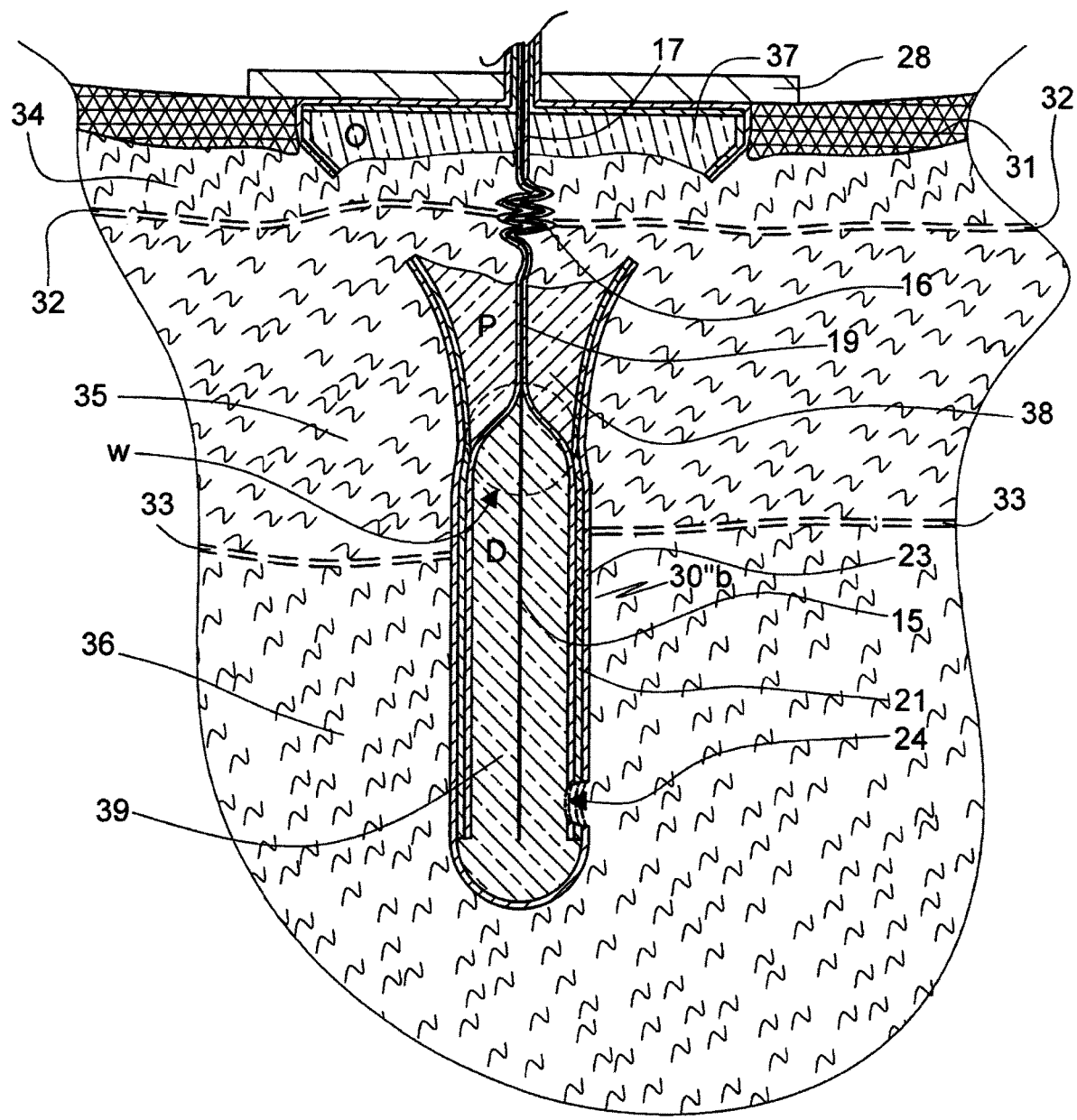

According to the present invention is disclosed a microelectrode formed in situ upon implantation of a microelectrode probe of the invention into nervous or endocrine tissue (FIG. 5b). The microelectrode is formed by dissolution or degradation of matrices of water soluble or water degradable material comprised by the probe. The removal of a circumferential section of the envelope or sleeve of the proximal compartment and the dissolution or degradation of the second matrix of the proximal compartment provides for a high significant lateral movement of the microelectrode embedded in soft tissue in respect of the cover (reference is specifically made to FIG. 5b and FIG. 6d).

According to the present invention is also disclosed a microelectrode array formed upon implantation into soft tissue, particularly neural or endocrine tissue, comprising two or more microelectrodes of the invention, each disposed in a protective envelope or coat (sleeve) of flexible polymer material. The microelectrode array is formed from a proto-microelectrode array probe of the invention in a manner by contact with aqueous body fluid corresponding to the formation of a microelectrode of the invention from a proto-microelectrode probe of the invention.

Thus, according to the present invention is disclosed a microelectrode probe for implantation by insertion into soft tissue, in particular nervous and endocrine tissue, comprising an electrically conducting core, the core comprising portions (or sections), centrally disposed in a rotationally symmetric envelope or sleeve of flexible polymer material and attached to the envelope or sleeve by a wall of flexible polymer material extending in a perpendicular or angular direction in respect of the axis of rotation (of the microelectrode/microelectrode probe) separating the envelope or sleeve into a distal compartment and a proximal compartment; wherein the distal compartment comprises a (first) matrix of first biocompatible material selected from one or more of carbohydrate material, proteinaceous material, other material, and wherein any such material is dissolvable or degradable in aqueous body fluid; wherein the proximal compartment comprises a (second) matrix of second biocompatible material selected from one or more of carbohydrate material, proteinaceous material, other material, and wherein any such material is dissolvable or degradable in aqueous body fluid; wherein the core portion disposed in the proximal compartment extends proximally of the compartment; wherein the (a) distal opening of the distal compartment is covered by a domed (spherical) cover or other cover narrowing in distal direction of flexible polymer material optionally disposed on or attached to a (third) matrix of a third biocompatible material selected from one or more of carbohydrate material, proteinaceous material, other material, and wherein any such material is dissolvable or degradable in aqueous body fluid; wherein the envelope or sleeve has at least one distal opening and a proximal opening; and wherein the matrix (or matrices) is (are) of stiff material(s) when dry.

By 'stiff' is meant a stiffness which inter alia facilitates the implantation of the microelectrode probe (or proto-microelectrode probe) into soft tissue, specifically nervous or endocrine tissue.

According to an embodiment of the microelectrode probe a circumferential section of the envelope or sleeve of the proximal compartment is absent.

By distal opening is meant an opening in the envelope or sleeve embracing the distal compartment or an opening in the cover covering the opening of the distal opening of the distal compartment. The opening may also be so positioned as to bridge the distal compartment and the cover. As evident from the description the cover comprises one layer of flexible polymer material, also referred to as the third layer. The envelope or sleeve embracing inter alia the distal compartment preferably comprises three layers of flexible polymer material, the layers referred to as first, second and third layers. The third layer of the distal compartment and the cover of the distal opening of the distal compartment is preferably formed simultaneously during the manufacturing process of the microelectrode probe.

The material of the microelectrode (such as the core of the microelectrode) can be any electrically conductive material fulfilling the characteristics a microelectrode for implantation into soft tissue, specifically endocrine and neural tissue. A variety of metals are suitable, but also conductive non-metal materials. Suitable materials are metals or mixtures of metals which reduce or even omit inflammatory reactions with the tissue surrounding the microelectrode, including platinum, iridium, gold, wolfram, stainless steel, copper and silver and mixtures thereof. Amalgams may also qualify as microelectrode material. Conductive non-metal materials include various conductive polymers and carbon-containing materials such as graphene, graphite and carbon nanotubes.

The core can be of a single metal or comprise two or more portions of different metals. Alternatively, the core can comprise two or more ultra-thin metallic wires. The thickness of the one or more wires is preferably from 10 nm to 100 nm or to 1 μm or 10 μm or even 100 μm. The two or more ultra-thin wires may be entangled such that the surface area is maximized. In particular, the core portion extending proximally of the proximal compartment can be of a material or of materials different from that or those of the portion disposed in the proximal and distal compartments. The microelectrode core present within the distal compartment may exhibit sections of the surface with a higher surface area than the average surface area of the core within the distal compartment. Suitably, the sections(s) exhibiting a higher surface area is(are) localized in the vicinity of the opening(s) of the insulated layers. The core present in the distal compartment may also comprise rugged portions or comprise protrusions near the opening(s). The rugged portions or protrusions are in the micro or nano scale.

A biodegradable material of the invention comprised by a device of the invention is fully or substantially fully degradable to degradation products dissolvable in aqueous body fluid within one or two weeks or up to four weeks upon implantation of the device. By substantially fully degradable is meant degradation of at least 98% by weight, preferably of at least 99% by weight or 99.5% by weight.

The matrix material can be made of any dissolvable/degradable material that is biocompatible. It is preferred for the biocompatible material (matrix material) to be or comprise gelatin, which is a preferred proteinaceous material. A preferred carbohydrate material is glucose. A preferred other material, that is, a material other than carbohydrate material and proteinaceous material, is polyethylene glycol.

According to a first preferred embodiment the core portion extending proximally of the proximal compartment comprises a core holder securable at a tissue different from that into which the probe is implanted, in particular osseous or connective tissue. It is preferred for the core holder to be attached, directly or indirectly, to the second biocompatible material.

According to a second preferred embodiment the portion of the core disposed between the proximal end of the distal compartment and the core holder is of a length greater by 10%, in particular greater by 20% or 50% or 100% or more than the shortest distance between the proximal end of the distal compartment and the core holder. Preferably, the portion of the core disposed between the proximal end of the distal compartment and the core holder comprises any of spiral, zig-zag or meander-formed section.

According to a further preferred aspect of the invention the microelectrode probe is embedded in a (fourth) matrix of fourth biocompatible material selected from carbohydrate material, proteinaceous material and other material, and wherein such material is dissolvable or degradable in aqueous body fluid. In this aspect a preferred variant of the microelectrode probe (or proto-microelectrode probe) is presented by FIG. 4i. The outermost layer of the microelectrode probe of this aspect is mostly the envelope or sleeve of a flexible polymer material (except for optional distal and/or proximal openings).

According to yet a further aspect of the invention the envelope or sleeve and distal section of the core portion extending distally of the distal compartment are embedded in a matrix of fourth biocompatible material selected from carbohydrate material, proteinaceous material and other material, and wherein such material is dissolvable or degradable in aqueous body fluid. The distal section of the core portion is equivalent to the cover of the distal opening of the distal compartment also referred to as hemisphere or sphere narrowing in a distal direction capping the distal opening of the distal compartment.

The core holder preferably comprises or consists of a stiff material and comprises a distal face and a proximal face. It is preferred for a proximal terminal section of the core portion extending proximally of the proximal compartment to penetrate the core holder from the distal to the proximal face. It is preferred for the core holder to comprise a cylindrical tube of smaller diameter than that of the core holder, in particular of a diameter equal to or smaller than the diameter of the bore in a bone at which the core holder is to be mounted, the tube extending from a distal face of the core holder in a distal direction. The tube is of same material as the holder or of a different material and is stable against degradation by aqueous body fluid. The term 'stiff' when relating to the core holder provides for an adequate fixation of the core while preserving the functionality of the in-situ microelectrode. The holder preferably imparts a stiffness which is suited for the relevant tissue for the cover to be directly or indirectly applied to.

According to a fourth preferred aspect of the invention the proximal compartment widens in a proximal direction in a linear or non-linear manner, in particular is of truncated conical form. A lateral, proximal widening wall of the proximal compartment can additionally be curved, in particular be of convex form. To improve anchorage in the tissue the wall of the proximal terminal section of the proximal department is preferably bent radially outwardly, such as by from 50 µm to 100 µm or more.

According to a fifth preferred aspect of the invention the core portion extending proximally of the proximal compartment is of a material or a dimension or both different from that of the core portion disposed in the proximal and distal compartment.

The wall of the distal compartment comprises three layers of flexible polymer material whereas that of the proximal compartment comprises two layers of flexible polymer material. It is preferred for the innermost layer of the wall of the distal compartment, the radially extending wall and the insulation layer on the core to be integral. It is also preferred for the domed cover and a layer of flexible polymer material comprised by the envelope or sleeve and a proximal extension thereof to be integral.

According to a further embodiment the proto microelectrode probe or microelectrode probe (or microelectrode) comprises at least one biologically active substance, e.g. anti-inflammatory substances, neurotrofic substances, sedatives, transmitter substances such as glutamate, glycine, GABA, dopamine, noradrenalin, and acetylcholine. The biologically active substances are suitably comprised within the distal compartment such that these substances can be released through opening(s) in the distal compartment. The biologically active substance may during the manufacturing of the microelectrode probe be added to the surface of the first matrix (of biocompatible material) and/or be comprised in the first matrix. Also, the biologically active substance may be applied on the core, specifically to the portion of the core located within the distal compartment.

According to the present invention is also disclosed a microelectrode probe device for incorporation into an array of microelectrode probes, the microelectrode probe device comprising an electrically conducting core disposed, in particular centrally disposed, in a rotationally symmetric envelope or sleeve of flexible polymer material comprising a proximal opening and a distal opening, the core being attached to the envelope or sleeve by a wall of flexible polymer material extending perpendicularly or angularly in respect of the axis of rotation and separating the envelope or sleeve into a distal compartment and a proximal compartment; wherein the proximal compartment comprises a stiff second matrix; comprising or consisting of one or more of biocompatible carbohydrate material, biocompatible proteinaceous material, biocompatible material other than carbohydrate and proteinaceous material; wherein the distal compartment comprises a stiff first matrix comprising or consisting of one or more of biocompatible carbohydrate material, biocompatible proteinaceous material, biocompatible material other than carbohydrate and proteinaceous material; wherein a core portion disposed in the proximal compartment extends proximally of the compartment; wherein the distal compartment comprises one or more openings; wherein a matrix is dissolvable or degradable in aqueous body fluid.

It is preferred that a distal opening of the distal compartment is covered by a domed (spherical) cover or other cover narrowing in a distal direction and of the cover to be of a (single layer of) flexible polymer material optionally supported by a third matrix of one or more of biocompatible carbohydrate material, biocompatible proteinaceous material, other biocompatible material, wherein the doomed cover or other cover narrowing in a distal direction or the lateral wall of the distal compartment comprises an opening or wherein they comprise a joint opening; wherein a matrix material is dissolvable or biodegradable in aqueous body fluid. It is preferred for the wall of the proximal compartment to comprise two layers of flexible polymer material and wherein that of the distal compartment comprises three layers of flexible polymer material. A portion of the core extending proximally from the proximal compartment preferably comprises any of spiral, zig-zag or meander-formed section; the portion of the envelope or sleeve forming the distal department comprises two or more layers of which the innermost one is integral with the wall extending perpendicularly or angularly in respect of the axis of rotation and with the insulation layer on the core extending proximally from the wall.

According to the present invention is furthermore disclosed an array of microelectrode probes comprising two or more microelectrode probe devices of the invention disposed in parallel or substantially in parallel and with their distal ends preferably disposed in a plane extending perpendicularly in respect of their axes, further comprising an array cover comprising or consisting of a stiff material; wherein proximal terminal sections of the cores extending proximally of the proximal compartments are attached to the array cover and are embedded, with the microelectrode probe devices by which they are comprised, in a common, rotationally symmetric, rigid array matrix of biocompatible material dissolvable or biodegradable in aqueous body fluid selected from one or more of carbohydrate material, proteinaceous material, material other than carbohydrate and proteinaceous material. It is preferred for the array matrix to extend to a distal face of the array cover and to be attached to that face. According to a preferred embodiment of the invention the diameter of the array matrix increases in a proximal direction starting at an axial plane dissecting a proximal compartment. Proximal terminal sections of the cores preferably penetrate the array cover and are accessible for electrical connection at a proximal face of the array cover or extend from that proximal face. According to a preferred aspect of the invention the array comprises, except for at an annular zone bordering the array cover or disposed in the vicinity of the array cover, a mantle of flexible polymer material covering and attached to the portion of the embedment of increasing diameter. The mantle is of a material resistant to the action of aqueous body fluid. It is preferred for the mantle to be adhesively attached to the wall of a proximal compartment of a microelectrode probe device. According to a preferred modification of the array of the invention two or more microelectrode probe devices are adhesively attached to each other at their envelope or sleeve walls. According to a further preferred aspect of the invention the array comprises a stiff array shell enclosing all elements of the array disposed distally of the array cover; wherein the array shell comprises or consists of one or more of biocompatible carbohydrate material, biocompatible proteinaceous material, other biocompatible material dissolvable or degradable in aqueous body fluid, in particular gelatin.

A method of manufacture of the microelectrode probe of the invention comprises: providing a metallic wire (or bundle of ultra-thin wires) or an electrically conducting wire of polymer material fastened at opposite sides of a frame, the wire comprising proximal and distal straight sections and an intermediate section, in particular an intermediate coiled, zig-zag or meandered section, extending between the straight sections; forming a first stiff matrix on a portion of the distal section of the wire; covering the first matrix and the portions of the wire not covered by the first matrix with first layer of flexible polymer material; covering the first layer on a portion of the wire extending from the first matrix in a proximal direction and comprising the intermediate wire section with a material capable of forming a stiff second matrix; covering the first layer and the second matrix with a second layer of flexible polymer material; cutting the metallic wire, the first and second layers and the first matrix near the distal end of the first matrix; optionally depositing a material capable of forming a third matrix on the distally facing face of the first matrix produced by cutting; covering the optionally third matrix and the second matrix layer with a third layer of flexible polymer material; removing a portion of the second and third layer, or removing the second and third layer at a circumferential annular zone of the second matrix covering the portion of the wire extending from the first matrix in a proximal direction and comprising the intermediate wire section; forming an opening by removing a portion of the first, second and third layer (the three layers capsuling the first matrix), alternatively (or additionally) forming an opening in the third layer capsuling the distal opening of the distal compartment; wherein a matrix material is selected from carbohydrate material, proteinaceous material and other material, wherein all matrix materials are biocompatible and dissolvable in aqueous body fluid, and is capable of forming a stiff matrix when dried. It is preferred for the amount of second matrix material applied to a given portion of the first layer of flexible polymer material to increase in a proximal direction. It is also preferred for all layers of flexible polymer material to be constituted by one and the same material.

In the manufacturing process a biologically active substance may be applied. After application of the first matrix a biologically active substance may be applied to the surface of said first matrix. Alternatively, the biologically active substance may be applied on the portion of the core which is to be covered by the first matrix in the subsequent step. A further alternative may be to introduce the biologically active substance to the first matrix, i.e. the provision of a first matrix comprising a biologically active substance(s). The biologically active substance may be comprised in a composition forming the first matrix upon application. Alternatively, the first matrix may be formed by a consecutive application of composition comprising biologically active substance(s) and matrix forming composition.

A method of manufacture of the array of microprobes of the invention comprises providing two or more microelectrode probes of any of the disclosed embodiments, positioning the probes in parallel or substantially in parallel; optionally attaching their mantles to each other by an adhesive; embedding the probes in a stiff first array matrix having a proximal end and a distal end; covering a proximal portion of the array matrix extending from the proximal end thereof with a layer of flexible polymer material resistant to degradation by aqueous body fluid; removing an annular zone of said layer of flexible polymer material intermediate between the proximal and distal ends thereof; covering the layer of flexible polymer material and the annular zone with a second stiff array matrix; wherein the first and the second array matrices are selected, independently of each other, from one or more of biocompatible material selected from carbohydrate material, proteinaceous material and other material, and wherein the matrix material is dissolvable or degradable in aqueous body fluid. It is preferred for the probes to be disposed with their distal ends in one plane. According to a preferred aspect of the invention the method comprising providing the array with a cover comprising a distal face and a proximal face, in a manner to make the array matrices adheringly abutting the distal face of the cover. It is furthermore preferred for the cover and a proximal portion of the second array matrix to be of cylindrical form and centered in respect of a common rotational axis, and for the diameter of the cover to be greater than the diameter of the cylindrical portion of the second array matrix. According to another preferred aspect the method of the invention comprises forming a distal terminal portion of the second array matrix in a tapering manner. When embedding a microelectrode probe in the first array matrix it is preferred to dispose it in a manner to make its rotational axis include an angle of less than 10°, in particular of less than 5° or 2° or 1°, in respect of the array axis or to be disposed in parallel with it.

The present invention will now be explained in more detail by reference to a number of preferred embodiments illustrated in a drawing which, for reasons of clarity, is not to scale.

SHORT DESCRIPTION OF THE FIGURES

The figures illustrate

Figure 4C:
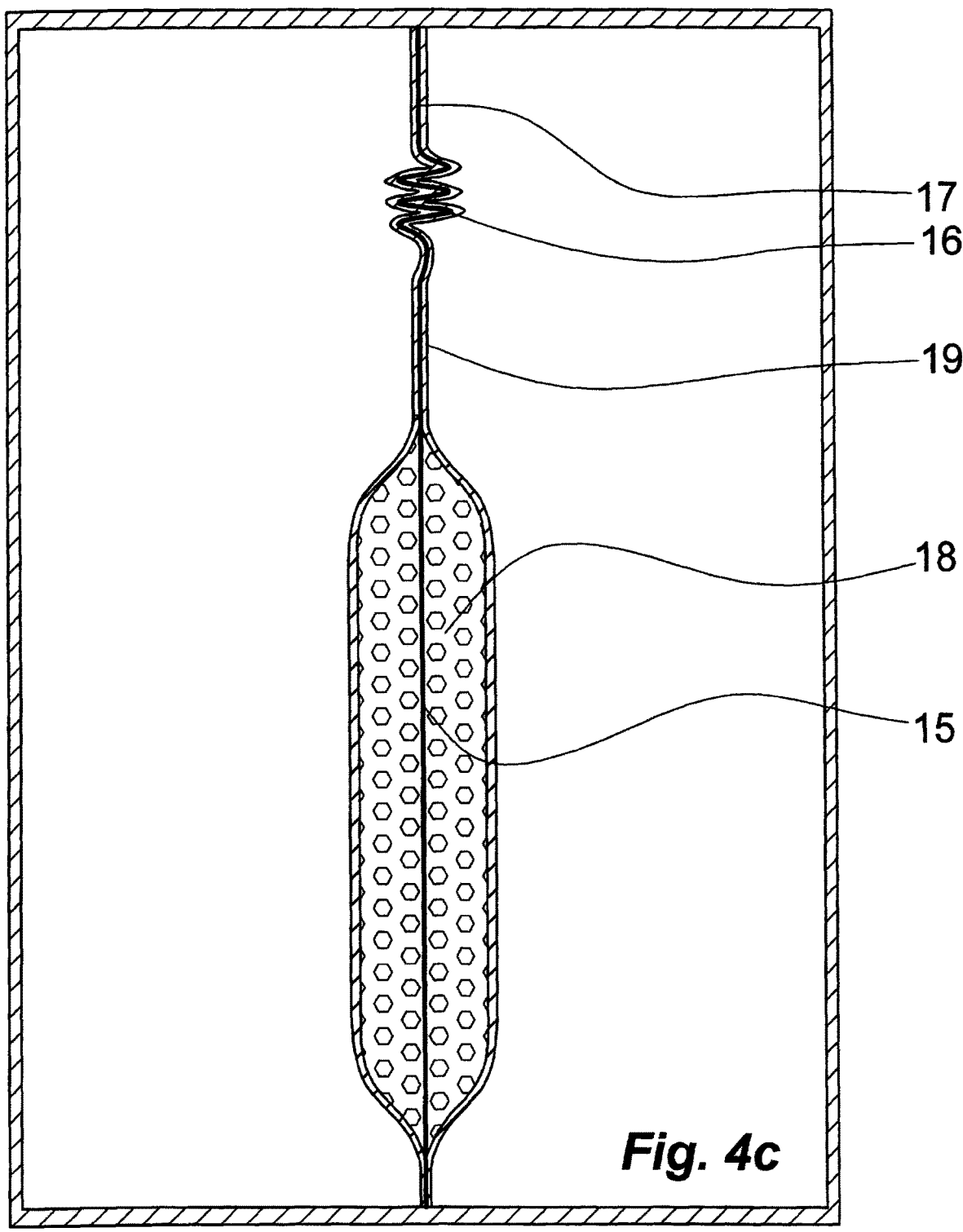
Figure 4D:
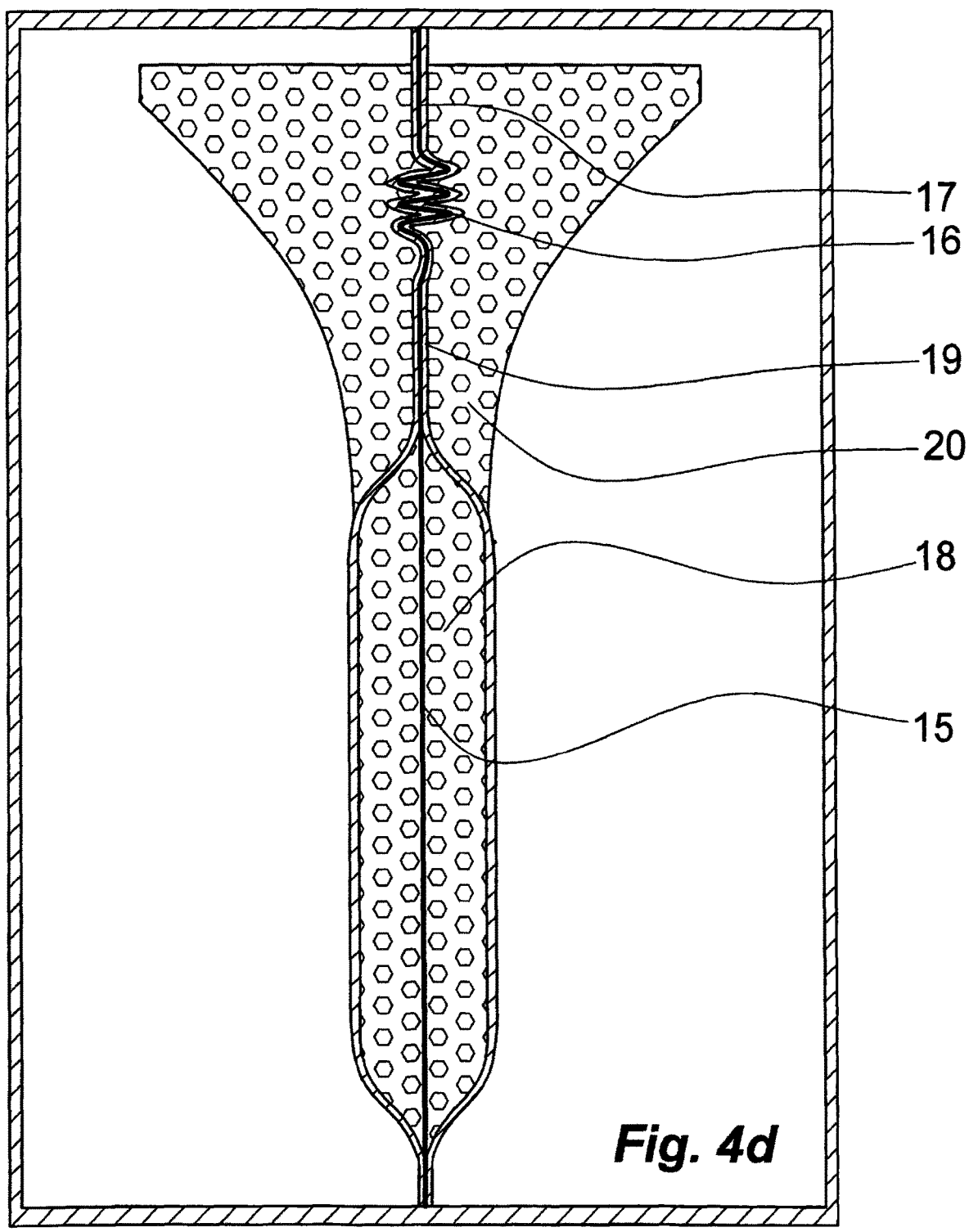
Figure 4E:
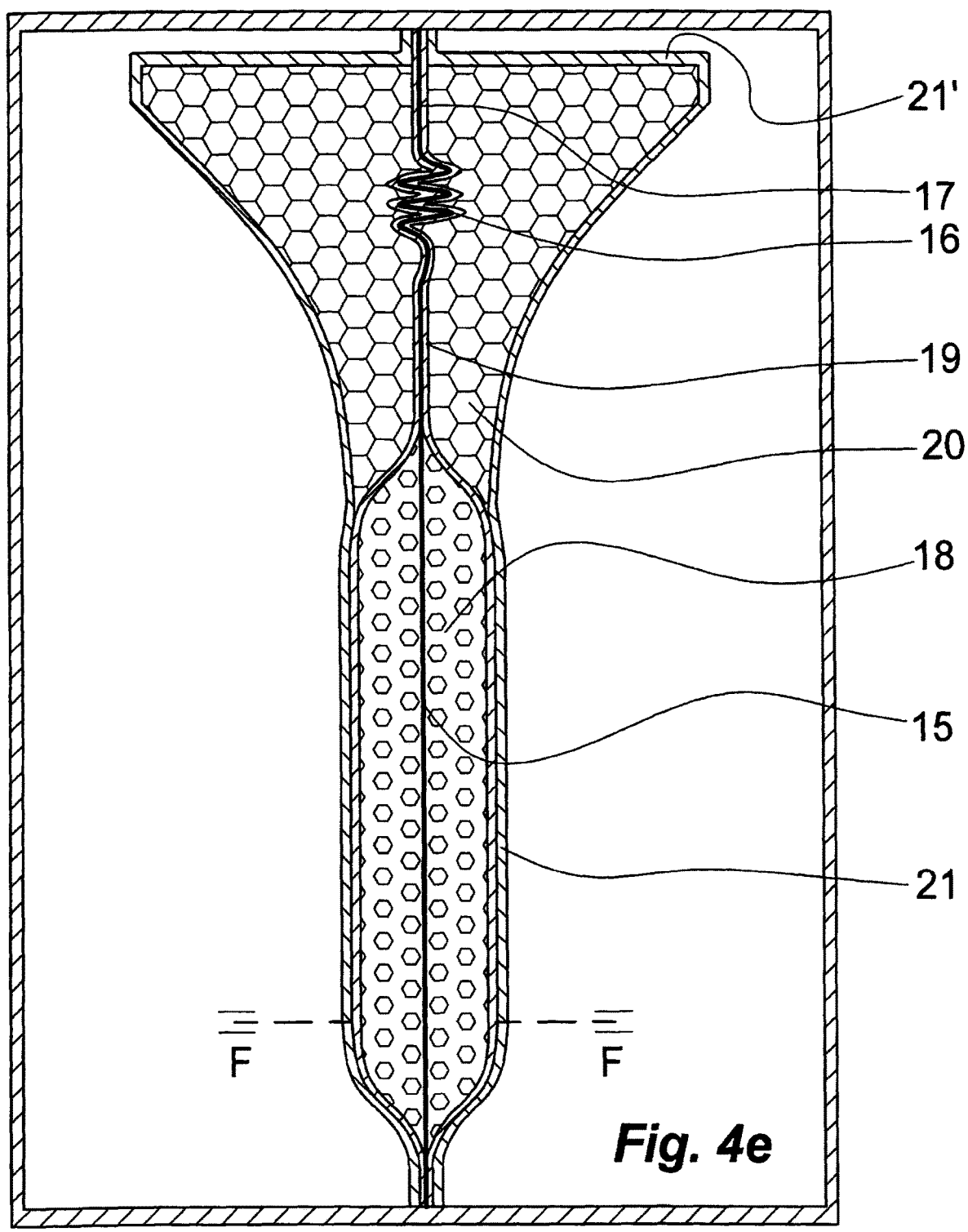
Figure 4F:
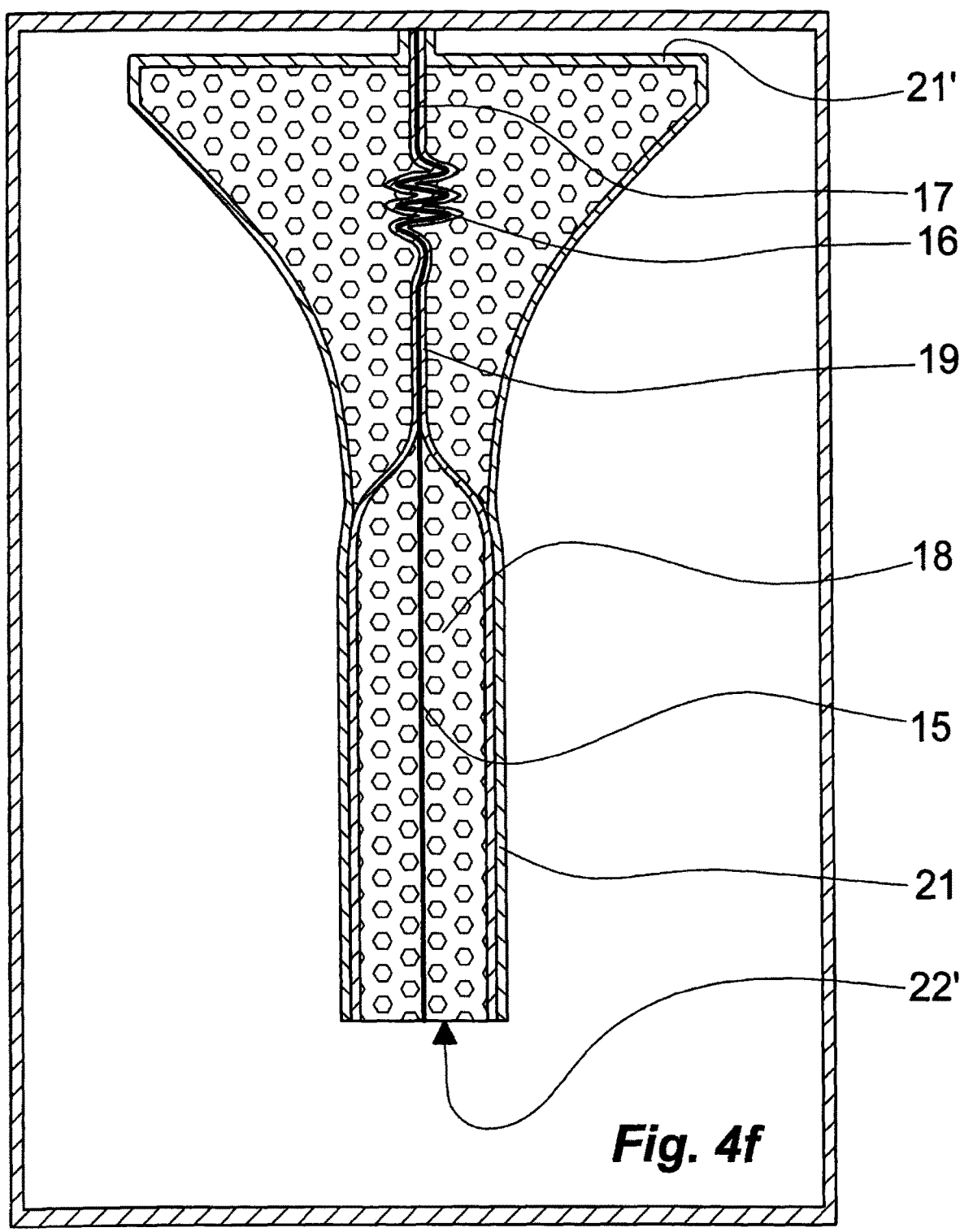
Figure 4G:
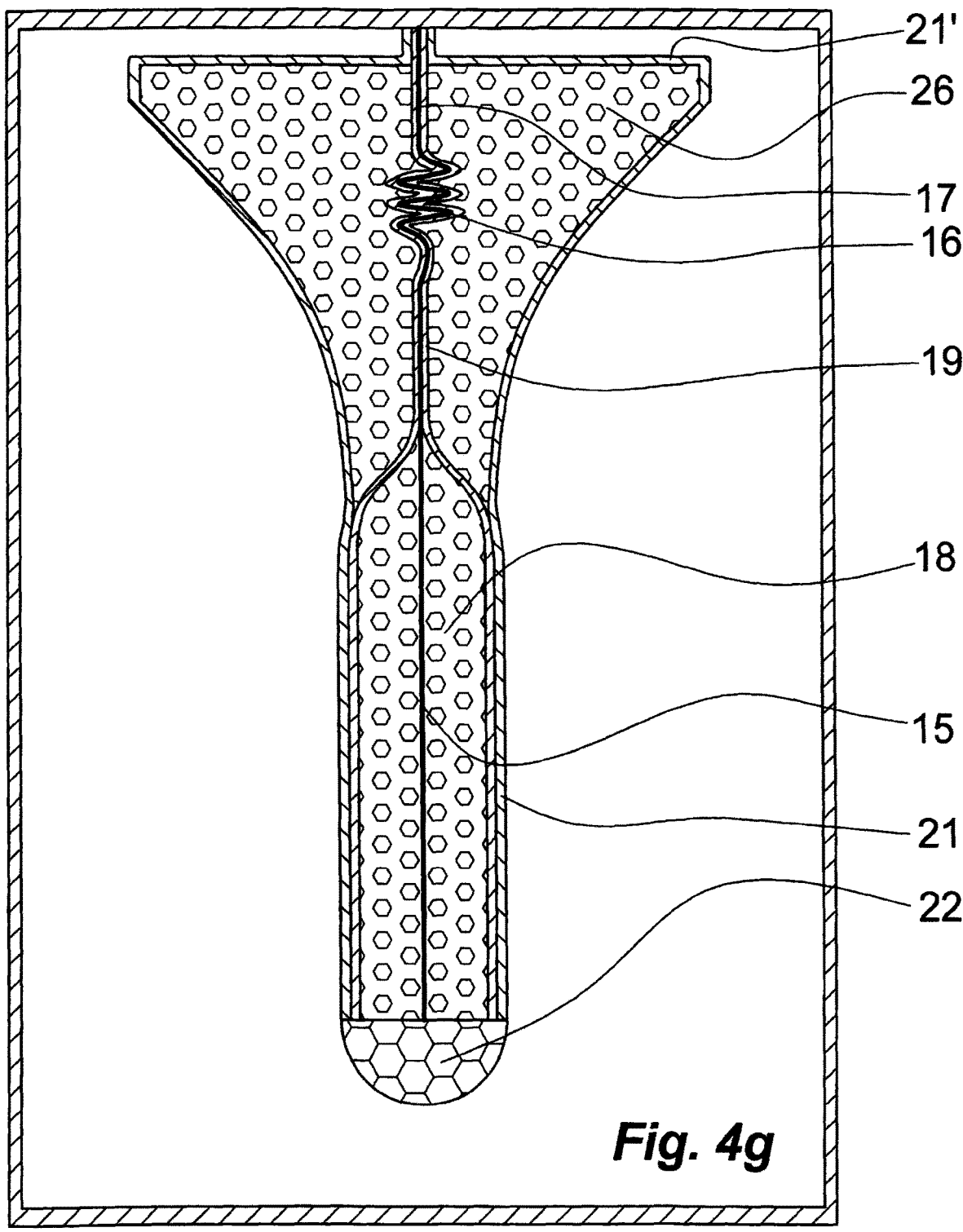
Figure 4H:
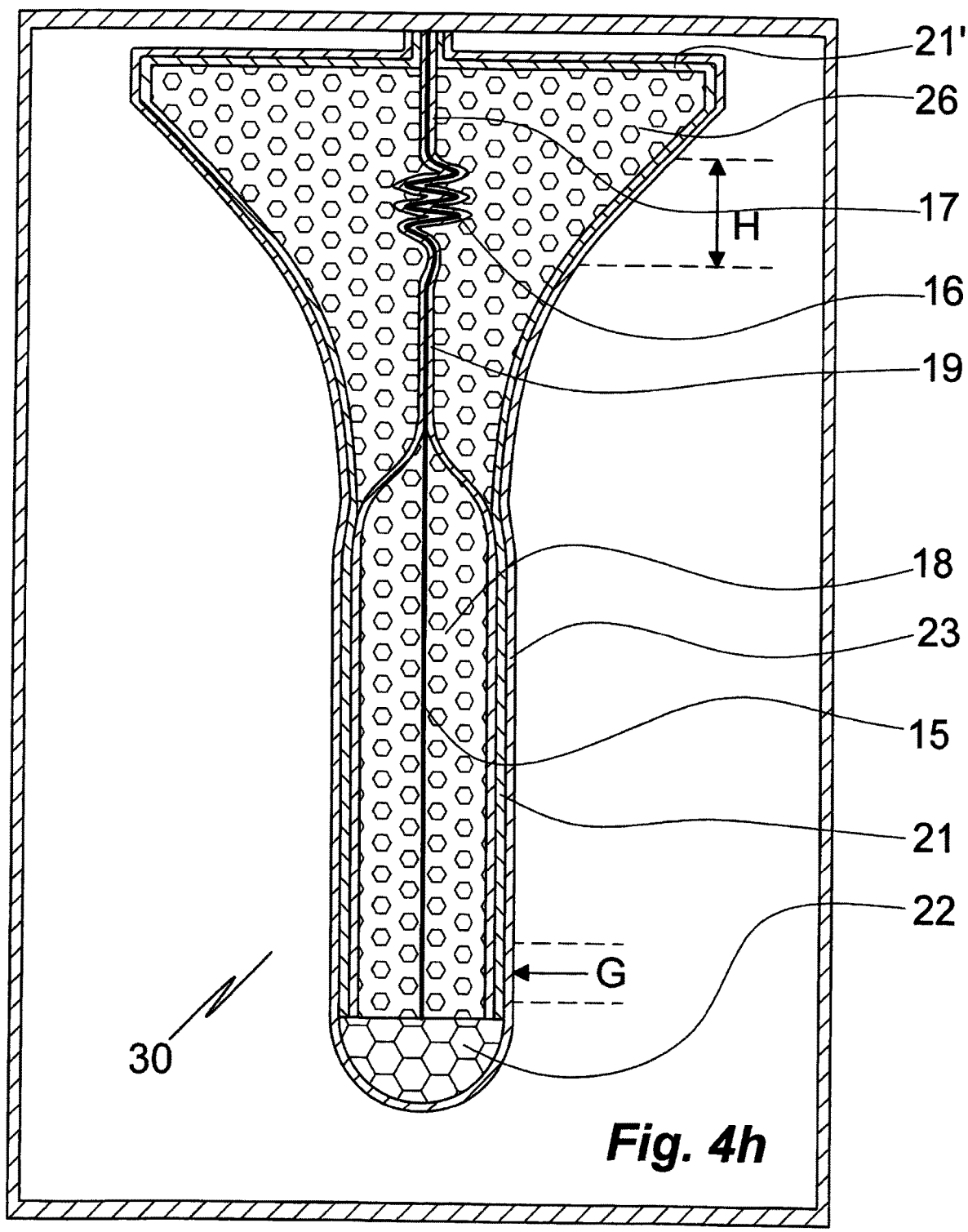
Figure 4I:
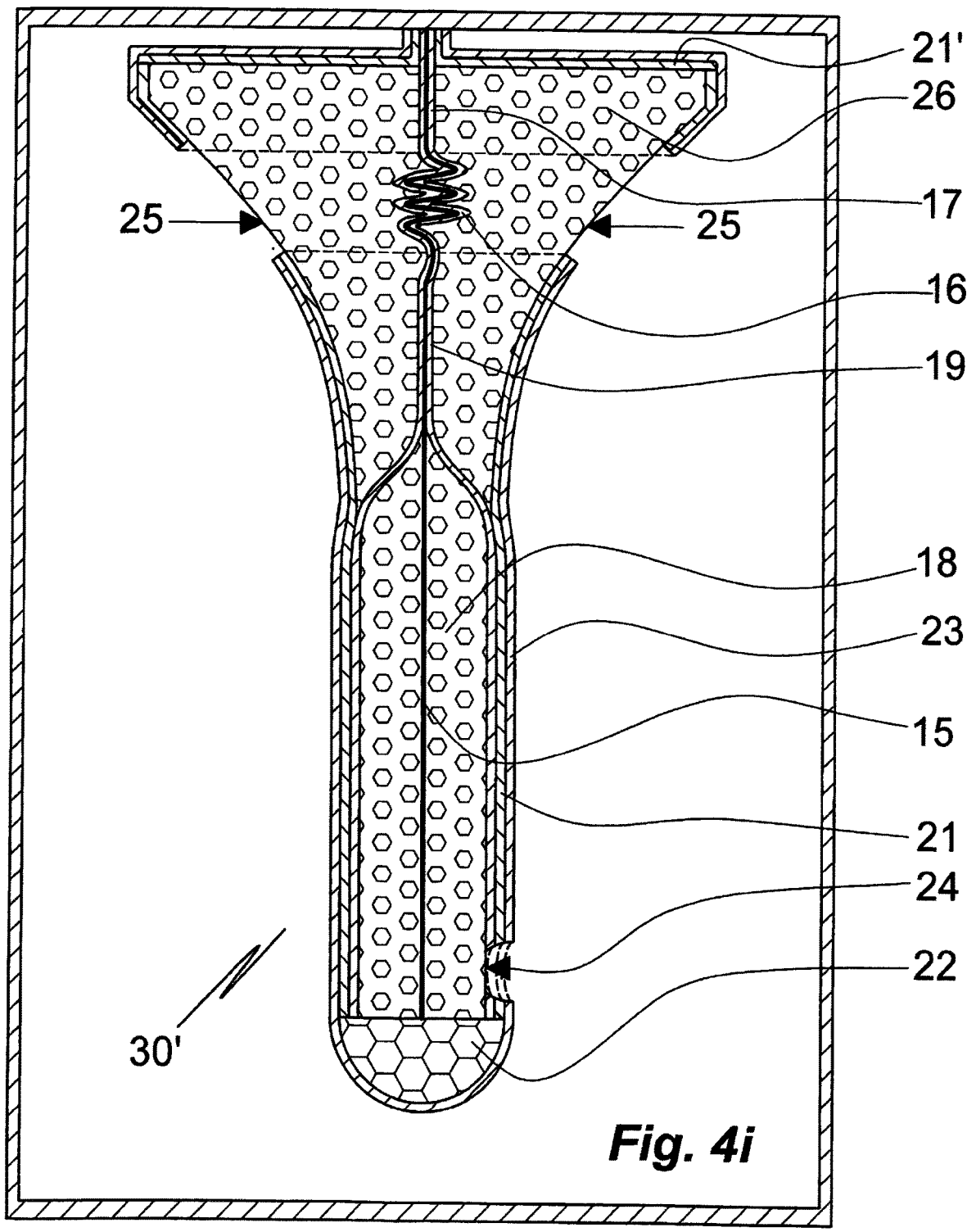

FIG. 1 A site of neural tissue for implantation of a microelectrode probe of the invention, in a section perpendicular to a bone protecting the site;

FIG. 2 The site of FIG. 1, after providing a circular hole in the bone, in the same section;

FIG. 2a A rough representation of a microelectrode probe of the invention, in an axial section;

FIG. 3 The site of FIG. 2, immediately upon implantation of the microelectrode probe of FIG. 2a, in the same section;

FIGS. 4a-4h A process for the manufacture of a microelectrode probe of the invention showing consecutive prestages of the microelectrode probe illustrated in FIG. 4i, in an axial section. (FIG. 4h: also referred to as proto-device)

FIG. 4i A microelectrode probe of the invention, in an axial section.

Figure 4J:
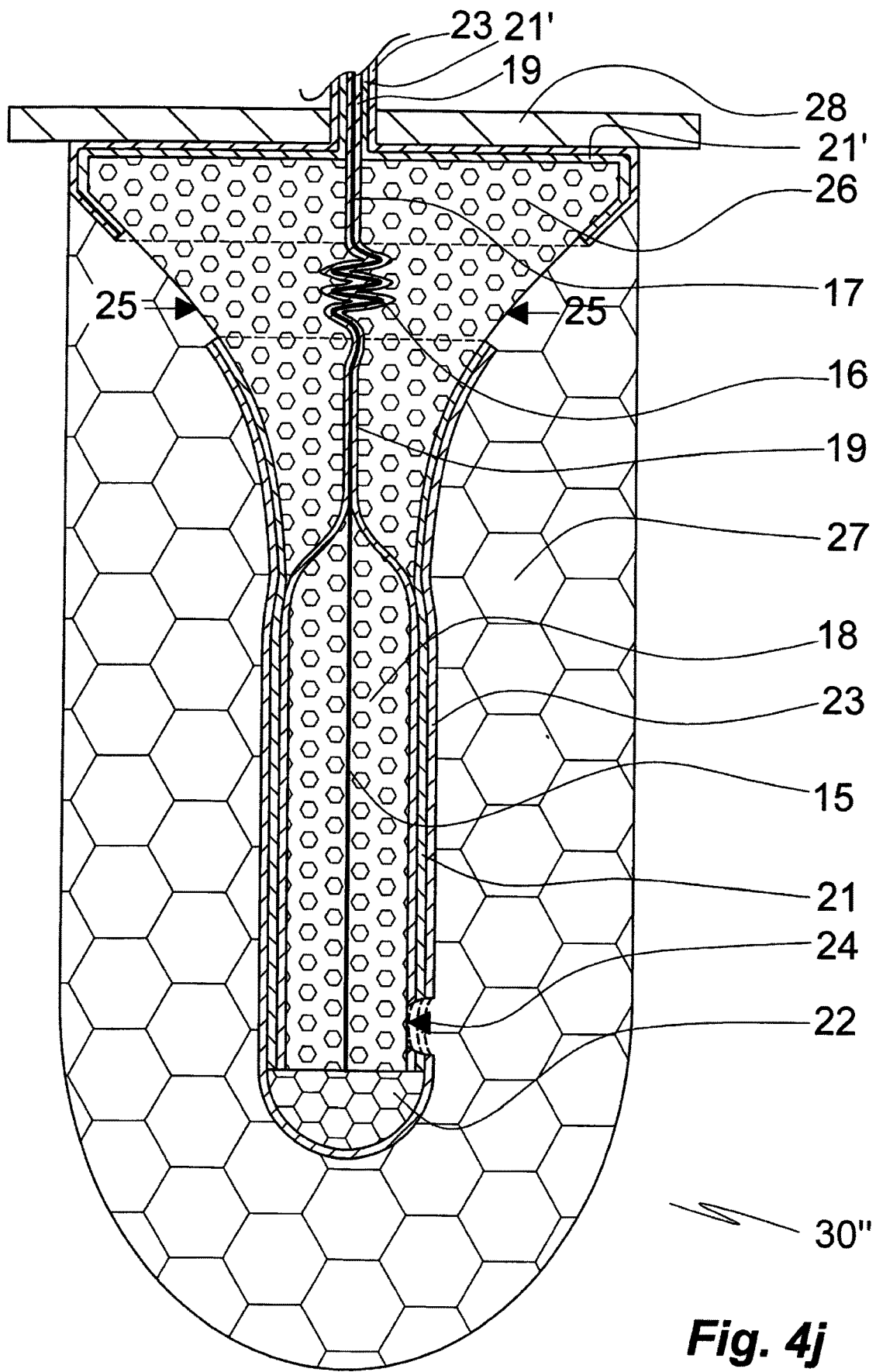

FIG. 4j A variety of the microelectrode probe of FIG. 4i, comprising an anchoring cover, in the same section.

FIG. 5 A microelectrode probe of the invention implanted in neural tissue, in an axial section prior to the complete dissolution of part of the $2^{nd}$ matrix in radial direction.

FIG. 5a The proto microelectrode probe of FIG. 5, implanted in neural tissue, in an intermediate stage of transformation to a microelectrode of the invention, in the same section as in FIG. 5.

FIG. 5b A microelectrode of the invention formed in situ (in situ microelectrode) from the microelectrode probe of FIG. 5, in the same section as in FIGS. 5, 5a.

FIG. 5c A partial view of FIG. 5, with a modified cover, in the same view.

FIG. 6a A simplified rendering of a microelectrode probe of the invention comprising a dissolvable cover, in a perspective view.

FIG. 6b The microelectrode probe of FIG. 6a in an intermediate stage of transformation to a microelectrode of the invention, upon implantation into nervous tissue and dissolution of its cover by aqueous body fluid, in the same view as in FIG. 6a.

FIG. 6c Sections of matrix materials comprised by the microelectrode probe of FIG. 6a, in the same view.

FIG. 6d, 6e A microelectrode of the invention formed in situ by complete dissolution of supporting matrix material of the intermediate stage of FIG. 6b, in the same section. FIG. 6d illustrates an angular displacement of the microelectrode core;

FIG. 6e additionally illustrates a deformation of its flexible cover by tissue abutting the cover.

Figure 7:
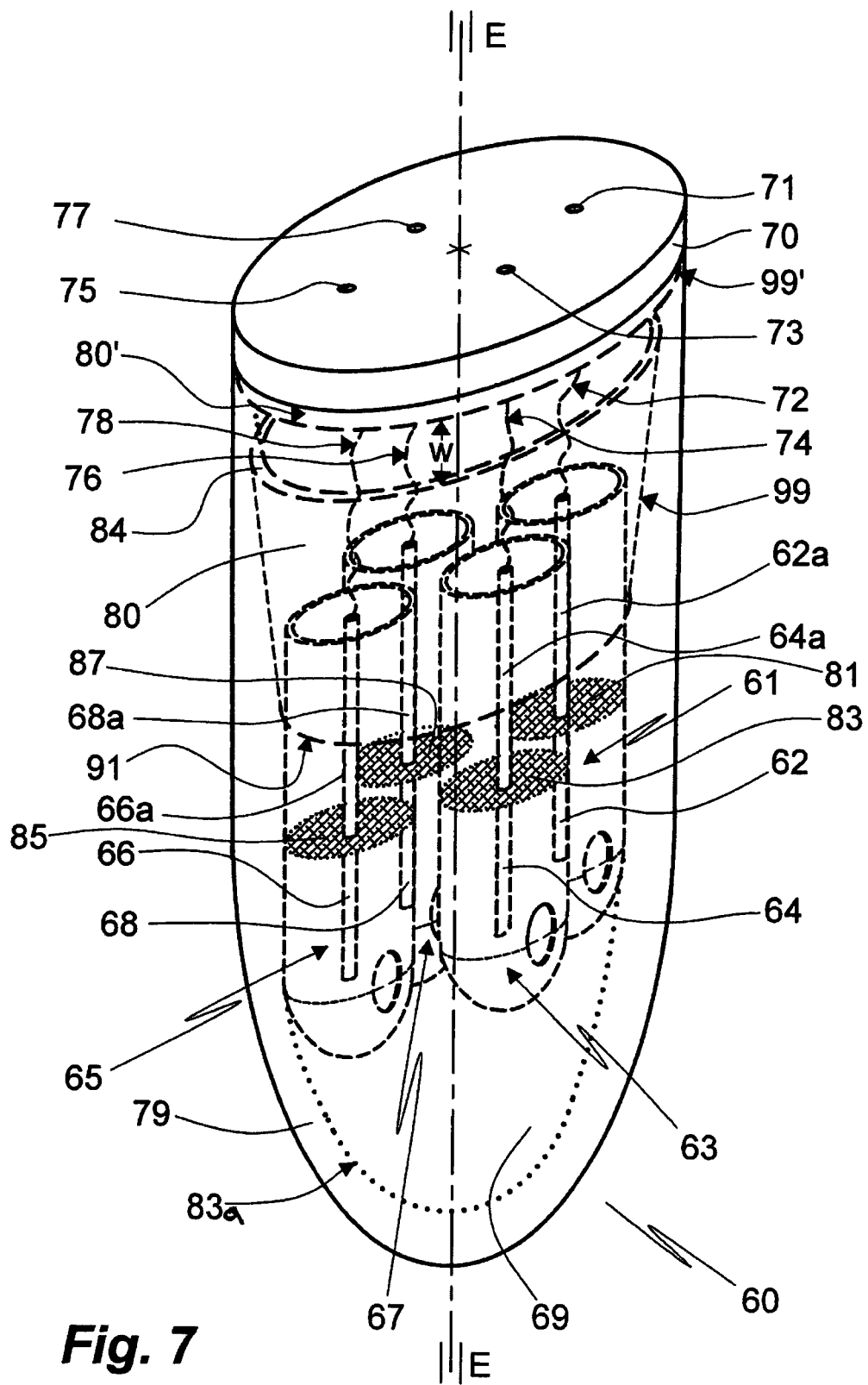

FIG. 7 An array of four microelectrode probes of the invention, in the same section as FIG. 6 and with the microelectrode probes in a similarly simplified rendering.

FIG. 7a A radial section A-A of the array of FIG. 7.

FIG. 7b A microelectrode probe of the invention for incorporation into an array of microelectrode probes, in a simplified perspective view, its sections of matrix material not being shown.

FIG. 7c A variety of the array of microelectrode probe of FIGS. 7, 7a, in the same section as FIG. 7a.

DESCRIPTION OF PREFERRED EMBODIMENTS

Example 1

Implantation and tissue environment principles. FIGS. 1, 2, 2a and 3 illustrate schematically the implantation of a microelectrode probe into neural tissue. The neural tissue 3 here is brain tissue, protected by the skull bone 1 from which it is separated by a thin layer 2 comprising several sub-layers, such as the dura mater, the arachnoid mater, the pia mater and cerebrospinal fluid. The neural tissue 3 is prone to displacement in respect of the skull bone 1 by movements of the head, the displacement in a direction parallel with the skull bone 1 (arrows b, b') generally being higher than in a perpendicular direction (arrows a, a'). Tissues intermediate between the skull bone 1 and brain tissue 3 are similarly displaced but not necessarily to the same extent.

Prior to implantation of a device according to the invention access to a desired position of the brain is provided by drilling a circular hole 8 in the skull (FIG. 2).

In the next step a device of the invention, such as the microelectrode probe 10 of the invention of FIG. 2a or a microelectrode probe array, is inserted through the hole 8 into brain tissue 3 (FIG. 3). Upon implantation the microelectrode probe 10 is transformed into a microelectrode (in situ microelectrode) of the invention by contact with aqueous body fluid. The fully functional in situ electrode is formed once the matrix materials have completely dissolved or been degraded. The microelectrode probe 10 comprises a cover 7 anchored at and protecting the hole 8 in the skull bone. The microelectrode 10 comprises a metallic or other electrically conducting core 6, 6', 6" extending from a distal section 6 via an intermediate section 6' attached to and penetrating the cover 7 to a proximal section 6", which extends from the proximal face of the cover 7 for electrical communication with a microelectrode control unit (not shown) disposed extracorporeally or implanted under the skin. The distal section 6 of the core 6, 6', 6" is housed in a sleeve or envelope of flexible polymer material comprising a proximal 4 compartment and a distal 9 compartment separated by a radially extending wall 10a penetrated by and attached to the distal section 6 of the electrode core. The portion of the core 6 housed in the distal compartment 9, that is, disposed distally of the wall 10a, is not electrically insulated while the reminder of the core 6', 6" is insulated. The intermediate section 6' of the core is preferably of substantially greater length than the distance between the proximal end of the distal compartment and the point of its attachment to the cover 7. The control unit can be mounted at or comprised by the cover 7 (not shown). If displaced by a movement of surrounding tissue the intermediate section 6' allows the core 6 and insulating or enclosing elements attached to it to be displaced with the core 6 in respect of the casing 7. For this reason, the length of the intermediate section 6' is designed to be substantially greater than a distance between its point of attachment to the casing and its distal end, that is, the end at which it is attached to or integral with the proximal end of the distal section of core 6, [6', 6"]. Distal end of the intermediate core 6' is localized at the proximal end of the distal compartment. A detailed description of a microelectrode probe of the invention and its manufacture is given in the following examples.

Example 2

Manufacture of a microelectrode of the invention. For an understanding of the structure of a microelectrode probe of the invention and a microelectrode formed from it upon implantation the description of a process of its manufacture is helpful. Such a process is illustrated in FIGS. 4a through 4h or 4j.

At start (FIG. 4a) the ends of a metallic wire 15, 16, 17 are fastened at opposite sides 11, 12 of a rectangular frame 11, 12, 13, 14. The wire 15, 16, 17 comprises long and short straight terminal sections 15, 17 and a pre-bent intermediate coiled, zig-zag or meandered extendable section 16. Typically, the wire 15, 16, 17 has thickness of a few μm, such as from 1 μm to 20 μm, in particular from 2 μm to 12 μm. The wire 15, 16, 17 can be a single piece or comprise two or more sections of different compositions, such as of a first section 15 of platinum or iridium and a second section of 16, 17 of gold. Instead of a single wire 15, 16, 17 a bundle of ultra-thin wires of metal or conducting polymer material can be used for improved flexibility.

In a second step an intermediate portion of the long straight section 15 is covered by electrospinning under dry conditions, preferably at 10% humidity or less, with low-molecular carbohydrate, such as glucose, or peptide or a mixture thereof, to form a substantially cylindrical layer 18 attached to the long straight section 15 (FIG. 4b); the thickness of the layer is from 5 μm to 100 μm, in particular from 20 μm to 50 μm. Alternatively, dip coating, spray coating or casting can be used for forming the layer.

In a third step the blank portions of the metallic wire 15, 16, 17 and the surface of the carbohydrate layer 18 are covered with a layer 19 of an insulating polymer material such as Parylene C or Parylene M by pyrolysis and deposition in vacuo (FIG. 4c). A preferred thickness of the insulating layer 19 is 10 μm or less, in particular 4 μm or less, such as 1 μm-2 μm.

In a fourth step, a layer of gelatin 20 is applied, e.g. by spray coating or casting, on a portion of the wire 15, 16, 17 extending in a proximal direction from the proximal end of the carbohydrate layer covered with insulating polymer 19 to near the proximal end of the short straight terminal part 17 of the intermediate section (FIG. 4d). In a proximal direction the diameter of the gelatin layer 20 increases from about the diameter of the carbohydrate layer 18, up to a diameter by a factor of two or more of the carbohydrate layer, but a constant diameter of the gelatin layer is also feasible.

In a fifth step, the entire proto-device is covered with a second layer 21 of electrically insulating polymer such as Parylene C (FIG. 4e) of a thickness similar to that of the first insulating layer 19.

In a sixth step, the result of which is illustrated in FIG. 4f, the proto-device is cut in a radial direction at section F-F, FIG. 4e to provide it with a flat distal terminal face 22'. A new distal end of wire portion of the distal section of the core 15 is centered at the face 22' and surrounded, in a radial direction, by the carbohydrate layer 18 and the insulating layers 19, 21.

In an optimal seventh step, a volume of e.g. gelatin 22, suitably in the form of a hemisphere 22 or other structure narrowing in a distal direction so as to form a distal end portion of the distal compartment after the addition of the layer in step eight is added to the face 22' (FIG. 4g) by e.g. casting.

In an eight step, the entire proto-device 30 is covered by an additional layer 23 of an electrically insulating polymer such as Parylene C (FIG. 4h). The third layer 23 is of a thickness similar to that of the first 19 and second 21 layers.

In two consecutive ninth and tenth steps, the sequence of which is interchangeable, the proto-device 30 (FIG. 4h) so produced is transformed into a proto microelectrode probe 30' of the invention (FIG. 4i). A hole 24 in polymer layers 19, 21, 23 is made in the vicinity (at G, FIG. 4h) of the distal terminal end of the wire 15, 16, 17 by laser evaporation followed by laser milling evaporation of a circumferential band (at H, FIG. 4h) of polymer layers 21, 23 near the proximal end of the proto device 30 of FIG. 4h to form an annular zone 25 not covered by insulating polymer.

The positioning and axial extent of the circumferential band may vary dependent on the types of tissues to be penetrated by the microelectrode probe.

The opening 24 trough polymer layers 19, 21, 23 may be made at any location such that the carbohydrate layer 18 surrounding the distal portion of the core 15 communicates with the exterior.

In a final step the proto microelectrode probe 30' of FIG. 4i is covered with gelatin by spray coating in a dry atmosphere of optionally reduced pressure to form a microelectrode probe 30" of the invention FIG. 4j comprising an external gelatin layer 27. Forming the gelatin layer 27 by casting is less preferred since the high humidity thereby created in the material covered by casting solution is detrimental to the structure of that material. The microelectrode probe of the invention 30" of cylindrical form comprising a distally rounded end thus formed is illustrated in FIG. 4j. Its gelatin layer 27 does not cover the proximal face or proximal terminal portion of the proto-device 30". At its proximal end or at its terminal portion the proto-device can optionally comprise a stiff cover 28 of polymer or other suitable material to facilitate its mounting in a hole of a bone covering the tissue into which it is desired to be implanted, such as the skull bone. To facilitate mounting the radial extension of the cover 28 is suitably greater than the diameter of the cylindrical portion of the microelectrode probe 30". At its proximal end the proximal section 17 of the polymer-covered 19, 21', 23 microelectrode core 15, 16, 17 is firmly mounted, by use of e.g. glue, at the cover 28, which it penetrates so as to be accessible at the proximal face thereof for electrical connection to an electrode control apparatus (not shown).

FIG. 5 illustrates, in an axial section, the microelectrode probe 30" of FIG. 4j implanted in the brain by insertion through a bore in the skull bone 31 with its cover 28 attached to the bone 31. The numbering of the various elements of the microelectrode probe 30" is identical with that of FIG. 4j. The implanted microelectrode probe 30" is shown to penetrate and abut to three different tissues numbered, from a proximal to distal direction, 34, 35, 36. The zones at which tissues 34, 35 and 35, 36 are bordering each other are numbered 32 and 33, respectively.

Upon implantation dissolvable and, if present, biologically degradable material of the microelectrode probe 30" is contacted by aqueous body fluid which can be of different composition depending on the tissue 34, 35, 36 from which it emanates.

The variety of the microelectrode probe of FIG. 5 illustrated in FIG. 5c differs from the former by its cover 28 being provided by short conical tubular section 28' protruding from its distal face. The diameter of the tubular section 28' is adapted to make it fit into and be retained in the hole of the bone through which the microelectrode probe 30 is to be inserted.

FIG. 5a shows the implanted microelectrode probe 30" in an intermediate stage 30"a of transformation to an in-situ microelectrode of the invention, in which the gelatinous cover 27 has been partially dissolved by aqueous body fluid to form an aqueous layer 29 rich in gelatin surrounding the remainder of the microelectrode probe.

Upon further contact with aqueous body fluid the remaining dissolvable or degradable carbohydrate 18 and gelatinous 22, 27, 26 material of the microelectrode probe 30"a is dissolved in or degraded by aqueous body fluid, thereby forming a microelectrode 30"b of the invention disposed in situ (FIG. 5b). Over time, aqueous body fluid surrounding the microelectrode 30"b and containing dissolved and/or degraded carbohydrate 18 and gelatinous 22, 27, 26 material is absorbed by neighboring tissues 34, 35, 36, thus permitting the tissues to abut the flexible polymer cover (19, 21) 23. In contrast, body fluid of similar kind 35', 36' is retained for extended periods of time in the interior of the cover 23, which is separated by wall section w into a proximal portion P containing body fluid 35' emanating from tissue 35 and a distal portion D containing body fluid 36' emanating from tissue 36. Electrical contact of the distal portion 15 of the microelectrode body 15, 16, 17 with adjacent tissue 36 is provided by the lateral window or hole 24 near the distal end of the microelectrode. The extendable coiled portion 16 bridges the border 32 between tissues 34, 35 which are prone to slide in respect of each other. A dislocation of the electrode core 15, 16, 17 caused by a sliding tissue movement is compensated by the extendable nature of the coiled part 16 of intermediate electrode core portion preventing or reducing a dislocation of the distal electrode portion 15, in particular at the distal end thereof disposed near the window 24.

Example 3

FIG. 6a illustrates, in a simplified manner and in a perspective view, a microelectrode probe 40 of the invention comprising a distal chamber 46, 52 with cylindric 46 and hemispheric 52 sections, and a proximal chamber 47 of cylindrical form. The chambers 46, 52; 47 are separated by a radially extending wall 43. The microelectrode probe 40 is substantially rotationally symmetric in respect of a central axis C-C extending in a proximal/distal direction. The walls 44, 50; 45 (FIG. 6b), respectively, of the chambers 46, 52; 47 and the separating wall 43 are of a flexible polymer material, such as a Parylene C. The chambers 46, 52; 47 are filled with one or more of biocompatible carbohydrate material and biocompatible proteinaceous material, such as glucose and gelatin; for instance, the proximal chamber 47 and the cylindric portion 46 of the distal chamber 46, 52 are filled with carbohydrate material while the hemispheric portion 52 of the distal chamber 46, 52 is filled with gelatin.

Preferably near the distal end of the probe depicted without shell (FIG. 6b) 40' the walls 44, 50 of the distal chamber 46, 52 comprise an opening or window 49 but may also comprise two or more windows disposed at any desired location of the distal chamber walls 44, 50. The chambers 46, 52; 47 are embedded in a shell 53 of a biocompatible material, in particular of a material capable of forming a gel in contact with aqueous body fluid such as gelatin (FIG. 6a, FIG. 6c). The shell 53 is rotationally symmetric in respect of the central axis C-C and has a rounded distal tip. The microelectrode probe 40 further comprises an electrically conducting electrode core 41, 41a, in particular of a metal such as gold or a metal alloy, centered in respect of the central axis C-C. At the proximal end of the electrode core portion 41a is attached a first electrical lead or extension 41' extending in a proximal direction to a circular cover 56 at which it can end at a coupling point 58 continue proximally of it in form of a second lead or extension 41"; alternatively the electrode core 41, 41a and its first 41' extension or the electrode core 41, 41a and both of its extensions 41', 41" can be of integral form, e.g. of a single wire. The first lead or extension 41' penetrates the cover 56 and continues in form of proximal section 41" proximally of the cover 56 to microelectrode control apparatus (not shown) or ends at a coupling means 58 attached to the cover 56 for coupling of a separate electrical lead 41" for connection with the control apparatus. The first extension 41' of the electrode core 41, 41a or the first lead 41'connecting the core 41, 41a with the cover 56 disposed between the proximal end of the proximal chamber 47 and the cover 56 is of substantial greater length, for instance comprises a coiled or meandered section, than required for direct connection to allow for absorption of changes of distance between the proximal chamber 47 and the cover 56 without straining the chamber walls 44, 50; 45, respectively, of the chambers 46, 52; 47.

FIG. 6b represents a variation of the microelectrode probe of the invention 40' lacking a shell of biocompatible material.

The biocompatible material filling the proximal chamber 47 extends to the distal face of the cover 56. It optionally widens in proximal direction to form a truncated cone section 48. While the terminal part of the distal portion of the electrode core 41 extending from the distal end of the core 41 to the separating wall 43 is devoid of electrical insulation, the proximal part of the distal portion of the electrode core 41a extending proximally of the wall 43 and extensions of it or leads attached to it 41', 41" are all insulated. The flexible transverse wall 43 is of same or similar polymer material as the other chamber walls 44, 45, 50. The distal end of the electrode core 41 is disposed at about the same axial level as the window 49 through with it is capable of electrical communication with adjacent soft tissue upon transformation of the microelectrode probe 40 or 40' into an implanted microelectrode (40", 40'"; FIGS. 6d, 6e) of the invention.

Flexible polymer wall sections 51, 51' of same polymer material as that of the wall 45 of the proximal chamber 47 extend in truncated-cone form between the proximal end of the proximal chamber 47 and the distal face of the cover 58, forming a truncated-cone chamber 48 enclosing a solid matrix of biocompatible material. The flexible polymer wall sections 51, 51' of the truncated cone chamber 48 are separated from each other by an annular zone 42 of width z, at which the matrix of biocompatible material lacks protection by a polymer wall.

For reasons of clarity, the chambers or chamber sections 52, 46, 47, 48 filled with biocompatible material and the shell 53 of biocompatible material are shown in FIG. 6c in the absence of all other elements.

FIGS. 6d, 6e illustrate, in a simplified manner and in two stages of deformation, a microelectrode 40", 40'" of the invention formed in soft tissue by dissolution or degradation of the shell 53 of biocompatible material and the biocompatible material filling chambers 52, 46, 47, 48. The flexible nature of the polymer material and the thickness of the cover walls 50, 44, 45, 51, 51' allows the microelectrode 40'" to adapt to displacements of adjacent tissue, that is, does not provide substantial resistance to movements of abutting tissues. In FIGS. 6d, 6e the distal chambers 46, 52 of FIGS. 6a, 6b are assigned reference no. 54 to indicate that they are filled with body fluid entering through window 49 whereas the proximal chambers 47, 48 of FIGS. 6a, 6b are assigned reference nos. 55, 57 to indicate that they are filled with body fluid entering via the annular opening at the zone 42 lacking a polymer wall of proximal chamber section 48; through the same opening the same body fluid also enters the flat chamber 59 defined by flexible polymer wall section 51' and the distal face of the cover 56.

Example 4

Microelectrode array probe. The microelectrode array probe 60 illustrated in FIGS. 7 and 7a comprises four microelectrode probes comprising oblong electrode cores 62, 62a; 64, 64a; 66, 66a; 68, 68a of metal or other conductor material coupled, at their proximal ends, to flexible leads 72, 74, 76, 78. Proximal terminal portions of the leads 72, 74, 76, 78 penetrate a circular casing or lock 70 of polymer material at the proximal face of which they are attached to microcontacts 71, 73, 75, 77 by soldering. The microcontacts 71, 73, 75, 77 serve as contact points for extracorporeal leads providing electrical connection with microelectrode control apparatus (not shown) or for intracorporeal leads providing electrical connection with implanted microelectrode control apparatus (not shown). The cores 62, 62a; 64, 64a; 66, 66a; 68, 68a are disposed in cylindrical envelopes or sleeves 61, 63, 65, 67 of flexible polymer material with an open proximal end and comprising a distal terminal extension of hemispherical form. About halfway between its distal and proximal ends the envelope or sleeve 61, 63, 65, 67 is separated into a proximal compartment and a distal compartment by a radially extending wall 81, 83, 85, 87 of same flexible polymer material. While the core portions 62, 64, 66, 68 disposed distally of the radially extending wall 81, 83, 85, 87 (i.e. located within the distal compartments) are not insulated, the core portions 62a, 64a, 66a, 68a proximally of the radially extending wall 81, 83, 85, 87 (and located in the proximal compartments) are insulated, in particular with a polymer material of same or similar kind as that of the envelope or sleeve 61, 63, 65, 67 or the radially extending wall 81, 83, 85, 87.

FIG. 7b illustrates a microelectrode probe 40a of same kind as the probes 61, 63, 65, 67; probe 40a illustrates the details not shown in FIG. 7b for lack of space. In FIG. 7b reference number 41 identifies the non-insulated distal portion of the electrode core 41, 41a while reference number 41a identifies its insulated proximal portion. An insulated electrical lead 41' is connected to the proximal end of core portion 41a. Walls 44, 45 of flexible polymer material define cylindrical proximal and distal compartments 46, 47 separated by a radially extending circular wall 43 of same or similar polymer material. The electrode core 41, 41a penetrates the wall 43 at its center and is there attached to it. At its distal end, the distal compartment 46 wall 44 is joined by a wall 50 of same or similar flexible polymer material defining a hemispherical distal extension 52 of the compartment 46. A lateral elliptic or circular opening 49 is provided at the border zone of the walls 44, 50 of the distal compartment 46 and its distal extension 52. Except for the radially extending wall 43 the flexible polymer walls 44, 45, 50 form coats on solid matrices of carbohydrate or proteinaceous or other biocompatible material dissolvable in aqueous body fluid, which fills the compartments 46, 52; 47 defined by the walls 43, 44, 50 and 43, 45, respectively.

In the microelectrode array probe 60 of FIGS. 7, 7a, the microelectrode probes 61, 63, 65, 67 are disposed symmetrically in parallel in respect of a central rotational axis E-E and with their distal and proximal ends in the same planes. The compartments of their microelectrode probes 61, 63, 65, 67 are filled with matrices of stiff carbohydrate and/or proteinaceous and or other biocompatible material dissolvable in aqueous body fluid; the microelectrode probes 61, 63, 65, 67 are embedded in a cylindrical array matrix of same or similar kind of material 69, 79 forming a rounded distal tip 83a and widening in the direction of the casing 70 from a axial level 91 positioned proximally of the radially extending wall 81, 83, 85, 87 so as to abut the distal face the casing 70 and to adhesively adhere to it. Except for an annular zone w in the vicinity of or adjacent to the distal face of the casing 70 the widening portion of carbohydrate and/or proteinaceous material is covered by a layer or mantle 99, 99' of same polymer material as that forming the microelectrode probe 61, 63, 65, 67 walls or by a layer of similar polymer material, thereby defining a proximal array compartment 80, 80' of truncated conical form, the distal 80 and proximal 80' portions of which are separated by said zone of width w. The zone of width w thus forms an annular window comprised by the truncated conical mantle 99, 99'.

In the radial section 7a of the microelectrode probe array 60 of FIG. 7 is shown at the level of the distal rim 91 of the truncated conical mantle 99, 99'. The walls of the proximal compartment are identified by reference numbers 92, 94, 96, 98 and cover first cylindrical carbohydrate or proteinaceous matrices or matrices of other kind 82, 84, 86, 88 surrounding proximal portions 62a, 64a, 66a, 68a of centrally disposed electrode cores (or: proximal parts of the distal section/portion of the cores) 62, 62a; 64, 64a; 66, 66a; 68, 68a. The compartments defined by their walls 92, 94, 96, 98 are enclosed by the array matrix 69 and so kept in position within the mantle 99, 99'. The array matrix 69 of carbohydrate or proteinaceous or other material of truncated conical form extends distally of the microelectrode probes 61, 63, 65, 67 to form a rounded distal tip.

The modification 90 of the microelectrode probe array 60 of FIGS. 7, 7a illustrated in FIG. 7c differs from the microelectrode probe array 60 by i cylindrical walls 92', 94', 96', 98' surrounding distal portions of 62a', 64a', 66a', 68a' of centrally disposed electrode cores being attached to each other in pairs by adhesive means such as a glue 93, 93', 93", 93''' comprising polymer material of same or similar kind as that constituting the cylindrical walls. Separately or additionally, the walls 92', 94', 96', 98' can be attached to the flexible polymer wall 99 of truncated conical form abutted by them, such as at glue point 97.

| Reference signs | |
|---|---|
| Letters | |
| a, a', b, b' | directions of tissue dislocation |
| α | tilting angle of axis E |
| w | width of annular zone free of polymer cover |
| C | central axis |
| E | tilted central axis |
| F | cutting plane |
| H | annular zone devoid of polymer layers 21, 23 |
| G | circular zone devoid of polymer layers 19, 21, 23 |
| D | distal compartment |
| O | cover compartment |
| P | proximal compartment |
| z | width of annular zone free of polymer cover |
| Numbers | |
| 1 | skull bone |
| 2 | thin soft tissue layer |
| 3 | neural (brain) tissue |
| 4 | proximal compartment of sleeve |
| 5 | gelatin layer ($3^{rd}$ matrix) |
| 6 | distal core section, 6' intermediate core section, 6" proximal core section |
| 7 | cover |
| 8 | hole or bore in skull bone |
| 9 | distal compartment of sleeve |
| 10 | 10: schematic figure of electrode probe; 10a: radial compartment wall |
| 11 | upper side of frame 11, 12, 13, 14 |
| 12 | lower side of frame |
| 13 | left hand side of frame |
| 14 | right hand side of frame |
| 15 | long straight terminal (distal) section of wire 15, 16, 17 |
| 16 | intermediate extendable section |
| 17 | short straight terminal (proximal) section |
| 18 | first matrix layer (cylindrical carbohydrate etc) layer |
| 19 | insulating layer of polymer material (first layer of polymer material) |
| 20 | second matrix layer (widening in a proximal direction) |
| 21 | second layer of polymer material; 21' second insulating layer |
| 22 | hemisphere of gelatin, 22' circular terminal face or distal opening of the distal compartment ($3^{rd}$ matrix) |
| 23 | third layer of polymer material' |
| 24 | hole or window in polymer layers 1-3 |

-continued

| | Reference signs |
|---|---|
| 25 | annular zone lacking polymer layers 2, 3 of height H |
| 26 | proximal zone protected by polymer layers 2, 3 |
| 27 | gelatin layer ($4^{th}$ matrix) |
| 28 | stiff cover |
| 29 | aqueous layer formed from gelatin layer 27 |
| 30 | proto microelectrode probe, 30', 30" microelectrode probe, 30"a microelectrode probe during disintegration of gelatin layer 27; 30"b microelectrode formed in situ |
| 31 | skull bone |
| 32 | first (proximal) tissue border |
| 33 | second (distal) tissue border |
| 34 | proximal soft tissue layer |
| 35 | intermediate soft tissue layer |
| 36 | distal soft tissue layer |
| 37 | solution of matrix 26 in aqueous body fluid originating from proximal layer 34 |
| 38 | solution of matrix 26 in aqueous body fluid originating from intermediate layer 35 |
| 39 | solution of matrix 18 in aqueous body fluid originating from distal layer 36 |
| 40 | microelectrode probe |
| 41 | electrode core, distal, not electrically insulated portion; 41a proximal, electrically insulated portion; 41' flexible electrical lead; 41" flexible electrical lead extension |
| 42 | border of matrix section not covered by flexible polymer layer |
| 43 | compartment separating wall |
| 44 | wall of distal chamber 46 |
| 45 | wall of distal section of proximal chamber 47 |
| 46 | proximal section of distal chamber |
| 47 | distal section of proximal chamber |
| 48 | distal section of truncated cone portion of proximal chamber |
| 49 | window |
| 50 | wall of domed distal terminal section 52 of distal chamber |
| 51 | wall of distal section of truncated cone section of proximal chamber; 51' wall of proximal portion of truncated section of proximal chamber |
| 52 | distal domed section of distal chamber |
| 53 | gelatin shell |
| 54 | proximal section of distal chamber filled with aqueous body fluid |
| 55 | distal portion of proximal chamber filled with aqueous body fluid; 55' proximal portion of proximal chamber filled with aqueous body fluid |
| 56 | cover |
| 57 | distal section of truncated cone portion of proximal chamber filled with aqueous body fluid |
| 58 | cover bore |
| 59 | proximal section of truncated cone portion of proximal chamber filled with aqueous body fluid |
| 60 | array of four microelectrode probes |
| 61 | first microelectrode probe |
| 62 | first electrode core, distal non-insulated portion; 62a proximal insulated portion |
| 63 | second microelectrode probe |
| 64 | second electrode core, distal non-insulated portion; 64a proximal insulated portion |
| 65 | third microelectrode probe |
| 66 | third electrode core, distal non-insulated portion; 66a proximal insulated portion |
| 67 | fourth microelectrode probe |
| 68 | fourth electrode core, distal non-insulated portion; 68a proximal insulated portion |
| 69 | array matrix |
| 70 | array casing |
| 71 | first microcontact |
| 72 | first flexible lead |
| 73 | second microcontact |
| 74 | second flexible lead |
| 75 | third microcontact |
| 76 | third flexible lead |
| 77 | fourth microcontact |
| 78 | fourth flexible lead |
| 79 | second array matrix |
| 80 | array compartment, distal portion; 80' proximal portion |
| 81 | radial wall of first microelectrode probe |
| 82 | matrix of proximal compartment of first microelectrode probe |
| 83 | radial wall of second microelectrode probe |
| 84 | matrix of proximal compartment of second microelectrode probe |
| 85 | radial wall of third microelectrode probe |
| 86 | matrix of proximal compartment of third microelectrode probe |
| 87 | radial wall of fourth microelectrode probe |
| 88 | matrix of proximal compartment of fourth microelectrode probe |
| 89 | compartment of fourth microelectrode probe |
| 90 | variety of array 60, same numbering as at array 60, marked with ' |
| 91 | distal border of distal section 99 of mantle 99, 99' |
| 92 | mantle of proximal compartment of first microelectrode probe |
| 93 | glue attaching proximal mantles of first and fourth microelectrode probes 93', 93", 93'" glue attaching mantles of probes 1, 2; 2, 3; 3, 4 |

| Reference signs | |
|---|---|
| 94 | mantle of proximal compartment of second microelectrode probe |
| 95 | — |
| 96 | mantle of proximal compartment of third microelectrode probe |
| 97 | glue point of walls 98', 99 |
| 98 | mantle of proximal compartment of fourth microelectrode probe distal wall portion of truncated cone mantle; |
| 99' | proximal wall section |
| 83a | rounded distal tip |

The invention claimed is:

1. A microelectrode probe for implantation by insertion into soft tissue for the provision of an implanted microelectrode comprising an electrically conductive core, the implanted microelectrode avoiding or reducing direct mechanical contact of the implanted electrically conducting core with adjacent soft tissue, in particular nervous or endocrine tissue, the electrically conductive core being centrally disposed in an envelope or sleeve of flexible, electrically insulating polymer material, the envelope or sleeve forming a lumen around the electrically conductive core and being spaced from the electrically conductive core, a wall of electrically insulating polymer material inside the envelope or sleeve surrounding the electrically conductive core, and extending radially from the envelope or sleeve toward the electrically conductive core, the wall being positioned between distal and proximal ends of the envelope or sleeve to define a distal compartment and a proximal compartment, the electrically conducting core being covered by a layer of electrically insulating material except for a portion disposed in the distal compartment, the layer of electrically insulating material being in direct contact with the electrically conducting core and the wall, and the wall separating the distal and proximal compartments in a fluid-impermeable manner;
  wherein the distal compartment comprises a matrix of first biocompatible material selected from one or more of carbohydrate material, proteinaceous material, other material, and wherein any such material is dissolvable or degradable in aqueous body fluid;
  wherein the proximal compartment comprises a matrix of second biocompatible material selected from one or more of carbohydrate material, proteinaceous material, other material, and wherein any such material is dissolvable or degradable in aqueous body fluid;
  wherein the conductive core portion disposed in the proximal compartment extends proximally of the proximal compartment;
  wherein the distal end of the distal compartment is covered by a domed (spherical) cover or other cover narrowing in distal direction of flexible, electrically insulating polymer material optionally disposed on or attached to a matrix of a third biocompatible material selected from one or more of carbohydrate material, proteinaceous material, other material, and wherein any such material is dissolvable or degradable in aqueous body fluid;
  wherein the distal compartment of the envelope or sleeve has at least one opening and that the proximal compartment is open proximally;
  wherein the matrix is of a stiff material when dry.

2. The microelectrode probe of claim 1, wherein the third biocompatible material is or comprises gelatin.

3. The microelectrode probe of claim 1, wherein the core portion extending proximally of the proximal compartment comprises a core holder securable at a tissue different from that into which the probe is implanted, in particular osseous or connective tissue.

4. The microelectrode probe of claim 3, wherein the core holder is directly or indirectly attached to the second biocompatible material.

5. The microelectrode probe of claim 4, wherein the portion of the core disposed between the proximal end of the distal compartment and the core holder is of a length greater by 10%, in particular greater by 20% or 50% or 100% or more than the shortest distance between the proximal end of the distal compartment material and the core holder.

6. The microelectrode probe of claim 5, wherein the portion of the core disposed between the proximal end of the distal compartment and the core holder comprises any of spiral, zig-zag or meander-formed section.

7. The microelectrode probe of claim 3, wherein the core holder consists of or comprises a stiff material, further comprising a distal face and a proximal face, and wherein a proximal terminal section of the core portion extending proximally of the proximal compartment penetrates the core holder from the distal to the proximal face.

8. The microelectrode probe of claim 3, wherein the core portion extending proximally of the proximal compartment is of a material different from that of the core portion disposed in the proximal and distal compartment.

9. The microelectrode probe of claim 1, embedded in a fourth matrix of fourth biocompatible material selected from carbohydrate material, proteinaceous material and other material, and wherein such material is dissolvable or degradable in aqueous body fluid.

10. The microelectrode probe of claim 1, wherein the proximal compartment widens in a proximal direction in a linear or non-linear manner.

11. The microelectrode probe of claim 10, wherein the proximal compartment is of truncated conical form.

12. The microelectrode probe of claim 11, wherein a proximal portion of the wall of the proximal compartment is curved, in particular convex.

13. The microelectrode probe of claim 1, wherein the core comprises ultra-thin metallic wires, the thickness of each wire being from about 10 nm up to about 100 μm, preferably from about 10 nm up to about 1 μm.

14. The microelectrode probe of claim 1, wherein the wall of the distal compartment comprises three layers of flexible polymer material and that of the proximal compartment comprises two layers of flexible polymer material.

15. The microelectrode probe of claim 14, wherein the innermost layer of the distal compartment, the radially extending wall and the insulation layer on the core are integral.

16. The microelectrode probe of claim 1, wherein the domed cover and the layer of flexible polymer material comprised by the envelope or sleeve and a proximal extension thereof are integral.

17. The microelectrode probe of claim 1, wherein the distal compartment comprises at least a biologically active substance.

18. The microelectrode probe of claim 1, wherein the core portion extending proximally of the proximal compartment is of a material or of materials different from that or those of the portion disposed in the proximal and distal compartments.

* * * * *